(12) United States Patent
Shim et al.

(10) Patent No.: US 7,377,873 B2
(45) Date of Patent: May 27, 2008

(54) SIX-SPEED POWERTRAIN OF AN AUTOMATIC TRANSMISSION

(75) Inventors: Hyu Tae Shim, Hwaseong (KR); Ki Been Lim, Yongin (KR); Gyung Cheol Lee, Gunpo (KR); Byeong Ho Soh, Hwaseong (KR); Kang Soo Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 330 days.

(21) Appl. No.: 11/302,065

(22) Filed: Dec. 12, 2005

(65) Prior Publication Data
US 2006/0135309 A1    Jun. 22, 2006

(30) Foreign Application Priority Data
Dec. 22, 2004    (KR) .................. 10-2004-0110555

(51) Int. Cl.
*F16H 3/44*    (2006.01)
(52) U.S. Cl. .................. 475/284; 475/288; 475/325
(58) Field of Classification Search ........ 475/275–293, 475/313, 319, 325
See application file for complete search history.

(56) References Cited

U.S. PATENT DOCUMENTS

| | | | | |
|---|---|---|---|---|
| 3,996,817 | A | * | 12/1976 | Winzeler .................. 475/69 |
| 5,133,697 | A | * | 7/1992 | Hattori .................. 475/276 |
| 5,954,613 | A | * | 9/1999 | Park .................. 475/275 |
| 6,626,789 | B2 | * | 9/2003 | Raghavan et al. .......... 475/275 |
| 7,044,881 | B2 | * | 5/2006 | Tabata et al. .............. 475/284 |
| 7,094,174 | B2 | * | 8/2006 | Miyazaki et al. ........... 475/324 |
| 7,115,060 | B2 | * | 10/2006 | Gumpoltsberger .......... 475/276 |

FOREIGN PATENT DOCUMENTS

EP    0 705 995 A2    4/1996

* cited by examiner

*Primary Examiner*—Roger Pang
(74) *Attorney, Agent, or Firm*—Morgan Lewis & Bockius LLP

(57) ABSTRACT

Six forward speeds and one reverse speed may be realized with minimized length and weight of the transmission by employing two single pinion planetary gear sets and a double pinion planetary gear set. One planetary gear of the double pinion planetary gear set is interconnected with an adjacent second planetary gear of the second single pinion planetary gear set by a common planet carrier such that they may rotate independently, and at the same time, at least two ring gears are integrated so as to enhance strength in the axial direction.

58 Claims, 13 Drawing Sheets

| Operating element | | CLUTCH | | BRAKE | | | OWC | Gear ratio (exemplary-value) | Step ratio |
|---|---|---|---|---|---|---|---|---|---|
| | | C1 | C2 | B1 | B2 | B3 | | | |
| D | 1st | | | (●) | ● | | ● | 4.642 | 1.659 |
| | 2nd | | | | ● | ● | | 2.797 | 1.550 |
| | 3rd | ● | | | ● | | | 1.805 | 1.320 |
| | 4th | | ● | | ● | | | 1.368 | 1.368 |
| | 5th | ● | ● | | | | | 1.000 | 1.298 |
| | 6th | | ● | | | ● | | 0.770 | total |
| R | | ● | | ● | | | | 3.355 | 6.025 |

SIX-SPEED POWERTRAIN OF AN AUTOMATIC TRANSMISSION

CROSS-REFERENCE TO RELATED APPLICATION

This application claims priority to and the benefit of Korean Patent Application No. 10-2004-0110555 filed in the Korean Intellectual Property Office on Dec. 22, 2004, the entire contents of which are incorporated herein by reference.

BACKGROUND OF THE INVENTION (a) Field of the Invention

The present invention relates to a six-speed powertrain of an automatic transmission for a vehicle enabling six forward speeds and one reverse speed.

(b) Description of the Related Art

A multi-stage gearshift mechanism of an automatic transmission includes a plurality of planetary gear sets. A powertrain having such a plurality of planetary gear sets varies the torque in multi-stages and outputs it to an output shaft when receiving a converted engine torque from a torque converter.

The more speeds the powertrain of an automatic transmission has, the better the power performance and fuel consumption. Therefore, it is desirable for powertrains to have as many speeds as possible.

Even for the same number of speeds, durability, power transmission efficiency, and size/weight of a transmission are substantially dependent on how planetary gear sets are arranged. Therefore, research for more structural strength, less power loss, and more compact packaging are continuously being conducted.

Usually, development of a powertrain using planetary gear sets does not devise a wholly new type of planetary gear set. To the contrary, it involves how single/double pinion planetary gear sets or a Ravingneaux planetary gearset are combined, and how clutches, brakes, and one-way clutches are disposed to the combination of planetary gear sets such that required shift speeds and speed ratios are realized with minimal power loss.

For a manual transmission, too many speeds cause a driver the inconvenience of excessive manual shifting. However, for an automatic transmission, a transmission control unit automatically executes shifting by controlling the operation of the power train, and therefore, more speeds usually implies more merits.

Accordingly, research of four-speed and five-speed powertrains has been undertaken, and recently, a powertrain of an automatic transmission enabling six forward speeds and one reverse speed has been developed. However, existing six speed automatic transmissions can have some drawbacks. For example, in one such powertrain, the first, second, and third ring gears are respectively connected with the second, third, and first planet carriers. Therefore, respective planet carriers are required to be separated, and such a configuration causes drawbacks of lengthening an automatic transmission and increasing a weight of the transmission. In addition, the ring gears are not interconnected and in this case, structural strength may not be sufficiently strong. Also, such a powertrain shows low gear ratios at the reverse gear and the highest gear such that gradeability in the reverse speed and front wheel drive performance may become inferior.

Furthermore, the gear ratio at the first forward speed can be too high and accordingly, the tire may easily slip at a hard acceleration. In addition, a step ratio between the second and third forward speeds is large, and thus tip-in shock may become large during a city driving circumstances of an intermediate speed.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of a six-speed powertrain of an automatic transmission of the present invention employ two single pinion planetary gear sets and a double pinion planetary gear set. One planetary gear of the double pinion planetary gear set is interconnected with an adjacent second planetary gear of the second single pinion planetary gear set by a common planet carrier such that they may rotate independently. In addition, while enabling six forward speeds and one reverse speed, at least two ring gears are integrated so as to enhance strength in axial direction, such that length and weight of a transmission may be minimized.

Embodiments of the present invention include one or more of the following advantages: gear ratios at the reverse gear and the highest gear are increased so as to enhance gradeability in the reverse speed and front wheel drive performance, and the gear ratio at the first forward speed is lowered so as to minimize the tire slip at a hard acceleration. At the same time, the step ratio between the second and third forward speeds may be set to be appropriate so as to avoid a tip-in shock.

An exemplary a six-speed powertrain of an automatic transmission according to an embodiment of the present invention includes first and second single pinion planetary gear sets and a double pinion planetary gear set. The powertrain may be configured such that: one planetary gear of the double pinion planetary gear set is interconnected with an adjacent second planetary gear of the second single pinion planetary gear set by a common planet carrier such that they may rotate independently; a ring gear of the double pinion planetary gear set and a ring gear of the first single pinion planetary gear set are fixedly interconnected such that they become integral; a ring gear of the second single pinion planetary gear set and a planet carrier of the first single pinion planetary gear set are fixedly interconnected; a sun gear of the double pinion planetary gear set always receives a torque from the input shaft; and six forward speeds and one reverse speed are realized by operating two clutches and three brakes.

In a further embodiment, the powertrain may be configured such that: the first and second single pinion planetary gear sets and the double pinion planetary gear set are disposed in an order of the first single pinion planetary gear set, the second single pinion planetary gear set, and the double pinion planetary gear set from an engine connected with an input shaft; a sun gear of the first single pinion planetary gear set is variably connected to a transmission case via a brake, and a planet carrier thereof acts as an output element; a sun gear of the second single pinion planetary gear set is variably connected to the input shaft via a clutch and also variably connected to the transmission case via a brake; and an operating element rotating at the same speed with the common planet carrier connecting planetary gears of the second single pinion planetary gear set and the double pinion planetary gear set is variably connected to the input shaft via a clutch and also to the transmission case via a brake and a one-way clutch disposed in parallel.

In a further embodiment, the operating element rotating at the same speed with the common planet carrier is the planet carrier of the double pinion planetary gear set that is variably connected to the input shaft via the clutch, and also variably connected to the transmission case via the brake and the one-way clutch.

The operating element rotating at the same speed with the common planet carrier may be the planet carrier of the double pinion planetary gear set that is variably connected to the input shaft via the clutch; and the planet carrier of the second single pinion planetary gear set may be variably connected to the transmission case via the brake and the one-way clutch.

The operating element rotating at the same speed with the common planet carrier may be the planet carrier of the double pinion planetary gear set that is variably connected to the transmission case via the brake and the one-way clutch; and the common planet carrier may be variably connected to the input shaft via the clutch.

The operating element rotating at the same speed with the common planet carrier may be the planet carrier of the second single pinion planetary gear set that is variably connected to the transmission case via the brake and the one-way clutch; and the common planet carrier may be variably connected to the input shaft via the clutch.

A free planet carrier of the first single pinion planetary gear set may be connected with an output gear so as to act as an output element.

The planet carrier of the first single pinion planetary gear set fixedly connected with the ring gear of the second single pinion planetary gear set may be connected with an output gear so as to act as an output element.

The clutch connected to the sun gear of the second single pinion planetary gear set and the clutch connected to the operating element rotating at the same speed with the common planet carrier may be dividedly disposed to both exterior sides of the first and second single pinion planetary gear sets and the double pinion planetary gear set.

The clutch connected to the sun gear of the second single pinion planetary gear set and the clutch connected to the operating element rotating at the same speed with the common planet carrier may be disposed in parallel at an engine side of the first single pinion planetary gear set.

The brake variably connecting the sun gear of the first single pinion planetary gear set to the transmission case may be defined as a second brake. The clutch variably connecting the sun gear of the second single pinion planetary gear set to the input shaft may be defined as a first clutch. The brake variably connecting the sun gear of the second single pinion planetary gear set to the transmission case may be defined as a third brake. The clutch variably connecting the operating element rotating at the same speed with the common planet carrier to the input shaft may be defined as a second clutch. The brake variably connecting the operating element rotating at the same speed with the common planet carrier to the transmission case may be defined as a first brake. For the first forward speed, the second brake and the one-way clutch operate. For the second forward speed, the third brake operates from the state of the first forward speed. For the third forward speed, the third brake is released and the first clutch operates from the state of the second forward speed. For the fourth forward speed, the first clutch is released and the second clutch operates from the state of the third forward speed. For the fifth forward speed, the second brake is released and the first clutch operates from the state of the fourth forward speed. For the sixth forward speed, the first clutch is released and the third brake operates from the state of the fifth forward speed. For the reverse speed, the first clutch and the first brake operate.

The powertrain may be configured such that: the first and second single pinion planetary gear sets and the double pinion planetary gear set are disposed in an order of the first single pinion planetary gear set, double pinion planetary gear set, and the second single pinion planetary gear set from an engine connected with an input shaft; a sun gear of the first single pinion planetary gear set is variably connected to the transmission case via a brake and a planet carrier thereof acts as an output element; a sun gear of the second single pinion planetary gear set is variably connected to the input shaft via a clutch and also variably connected to the transmission case via a brake; and an operating element rotating at the same speed with the common planet carrier connecting planetary gears of the second single pinion planetary gear set and the double pinion planetary gear set is variably connected to the input shaft via a clutch and also variably connected to the transmission case via a brake and a one-way clutch disposed in parallel.

The operating element rotating at the same speed with the common planet carrier may be the planet carrier of the double pinion planetary gear set that is variably connected to the input shaft via the clutch; and the planet carrier of the second single pinion planetary gear set may be variably connected to the transmission case via the brake and the one-way clutch.

The operating element rotating at the same speed with the common planet carrier may be the planet carrier of the second single pinion planetary gear set that is variably connected to the transmission case via the brake and the one-way clutch; and the common planet carrier is variably connected to the input shaft via the clutch.

The planet carrier of the first single pinion planetary gear set fixedly connected with the ring gear of the second single pinion planetary gear set may be connected with an output gear so as to act as an output element.

The clutch connected to the sun gear of the second single pinion planetary gear set and the clutch connected to the operating element rotating at the same speed with the common planet carrier may be dividedly disposed to both exterior sides of the first and second single pinion planetary gear sets and the double pinion planetary gear set.

The clutch connected to the sun gear of the second single pinion planetary gear set and the clutch connected to the operating element rotating at the same speed with the common planet carrier may be respectively disposed exterior to the second single pinion planetary gear set and between the double pinion planetary gear set and the first single pinion planetary gear set.

The clutch connected to the sun gear of the second single pinion planetary gear set and the clutch connected to the operating element rotating at the same speed with the common planet carrier may be disposed in parallel at an exterior side of the second single pinion planetary gear set opposite to the engine.

The brake variably connecting the sun gear of the first single pinion planetary gear set to the transmission case may be defined as a second brake. The clutch variably connecting the sun gear of the second single pinion planetary gear set to the input shaft may be defined as a first clutch. The brake variably connecting the sun gear of the second single pinion planetary gear set to the transmission case may be defined as a third brake. The clutch variably connecting the operating element rotating at the same speed with the common planet carrier to the input shaft may be defined as a second clutch. The brake variably connecting the operating element rotating at the same speed with the common planet carrier to the transmission case may be defined as a first brake. For the first forward speed, the second brake and the one-way clutch operate. For the second forward speed, the third brake operates from the state of the first forward speed. For the third forward speed, the third brake is released and the first clutch operates from the state of the second forward speed. For the fourth forward speed, the first clutch is released and the second clutch operates from the state of the third forward speed. For the fifth forward speed, the second brake is released and the first clutch operates from the state of the fourth forward speed. For the sixth forward speed, the first clutch is released and the third brake operates from the state of the fifth forward speed. For the reverse speed, the first clutch and the first brake operate.

The powertrain may also configured such that: the first and second single pinion planetary gear sets and the double pinion planetary gear set are disposed in an order of the second single pinion planetary gear set, the double pinion planetary gear set, and the first single pinion planetary gear set from an engine connected with an input shaft; a sun gear of the first single pinion planetary gear set is variably connected to the transmission case via a brake, a planet carrier thereof or a ring gear of the double pinion planetary gear set fixedly connected therewith acts as an output element; a sun gear of the second single pinion planetary gear set is variably connected to the input shaft via a clutch and also variably connected to the transmission case via a brake; and an operating element rotating at the same speed with the common planet carrier connecting planetary gears of the second single pinion planetary gear set and the double pinion planetary gear set is variably connected to the input shaft via a clutch and also variably connected to the transmission case via a brake and a one-way clutch disposed in parallel.

The operating element rotating at the same speed with the common planet carrier may be the planet carrier of the double pinion planetary gear set that is variably connected to the input shaft via the clutch; and the planet carrier of the second single pinion planetary gear set may be variably connected to the transmission case via the brake and the one-way clutch.

The operating element rotating at the same speed with the common planet carrier may be the planet carrier of the second single pinion planetary gear set that is variably connected to the transmission case via the brake and the one-way clutch; and the common planet carrier may be variably connected to the input shaft via the clutch.

The ring gear of the double pinion planetary gear set fixedly connected to the planet carrier of the first single pinion planetary gear set may be connected with an output gear so as to act as an output element.

A free planet carrier of the first single pinion planetary gear set may be connected with an output gear so as to act as an output element.

The brake variably connecting the sun gear of the first single pinion planetary gear set to the transmission case may be defined as a second brake. The clutch variably connecting the sun gear of the second single pinion planetary gear set to the input shaft may be defined as a first clutch. The brake variably connecting the sun gear of the second single pinion planetary gear set to the transmission case may be defined as a third brake. The clutch variably connecting the operating element rotating at the same speed with the common planet carrier to the input shaft may be defined as a second clutch. The brake variably connecting the operating element rotating at the same speed with the common planet carrier to the transmission case may be defined as a first brake. For the first forward speed, the second brake and the one-way clutch operate. For the second forward speed, the third brake operates from the state of the first forward speed. For the third forward speed, the third brake is released and the first clutch operates from the state of the second forward speed. For the fourth forward speed, the first clutch is released and the second clutch operates from the state of the third forward speed. For the fifth forward speed, the second brake is released and the first clutch operates from the state of the fourth forward speed. For the sixth forward speed, the first clutch is released and the third brake operates from the state of the fifth forward speed. For the reverse speed, the first clutch and the first brake operate.

The powertrain may also configured such that: the first and second single pinion planetary gear sets and the double pinion planetary gear set are disposed in an order of the first single pinion planetary gear set, the second single pinion planetary gear set, and the double pinion planetary gear set from an engine connected with an input shaft; a sun gear of the first single pinion planetary gear set is variably connected to the transmission case via a brake and a planet carrier thereof acts as an output element; a sun gear of the second single pinion planetary gear set is variably connected to the input shaft via a clutch and also variably connected to the transmission case via a brake; ring gear of the double pinion planetary gear set is variably connected to the input shaft via the clutch; and the planet carrier of the second single pinion planetary gear set is variably connected to the transmission case via the brake and the one-way clutch.

A free planet carrier of the first single pinion planetary gear set may be connected with an output gear so as to act as an output element.

The planet carrier of the first single pinion planetary gear set fixedly connected with the ring gear of the second single pinion planetary gear set may be connected with an output gear so as to act as an output element.

The brake variably connecting the sun gear of the first single pinion planetary gear set to the transmission case may be defined as a second brake. The clutch variably connecting the sun gear of the second single pinion planetary gear set to the input shaft may be defined as a first clutch. The brake variably connecting the sun gear of the second single pinion planetary gear set to the transmission case may be defined as a third brake. The clutch variably connecting the ring gear of the double pinion planetary gear set to the input shaft may be defined as a second clutch. The brake variably connecting the planet carrier of the second single pinion planetary gear set to the transmission case may be defined as a first brake. For the first forward speed, the second brake and the one-way clutch operate. For the second forward speed, the third brake operates from the state of the first forward speed. For the third forward speed, the third brake is released and the first clutch operates from the state of the second forward speed. For the fourth forward speed, the first clutch is released and the second clutch operates from the state of the third forward speed. For the fifth forward speed, the second brake is released and the first clutch operates from the state of the fourth forward speed. For the sixth forward speed, the first clutch is released and the third brake operates from the state of the fifth forward speed. For the reverse speed, the first clutch and the first brake operate.

Another exemplary six-speed powertrain of an automatic transmission according to an embodiment of the present invention includes: a first single pinion planetary gear set including a first sun gear, a first planetary gear, and a first ring gear; a second single pinion planetary gear set including a second sun gear, a second planetary gear, and a second ring gear; and a double pinion planetary gear set including a third sun gear, a pair of third planetary gears, and a third ring gear, wherein: one third planetary gear among the pair of third planetary gears is interconnected with an adjacent second planetary gear by a common planet carrier such that they may rotate independently; the third ring gear and the first ring gear are fixedly interconnected such that they may become integral; the second ring gear and the first planet carrier are fixedly interconnected; the third sun gear is fixedly connected with the input shaft so as to always receive a torque therefrom; and six forward speeds and one reverse speed are realized by operating two clutches and three brakes.

The powertrain may be configured such that: the first and second single pinion planetary gear sets and the double pinion planetary gear set are disposed are disposed in an order of the first single pinion planetary gear set, the second single pinion planetary gear set, and the double pinion planetary gear set from an engine connected with an input shaft; the first sun gear is variably connected to the transmission case via the second brake and the first planet carrier act as an output element; the second sun gear is variably connected to the input shaft via the first clutch and also variably connected to the transmission case via the third brake; and an operating element rotating at the same speed with the common planet carrier interconnecting the second and third planetary gears is variably connected to the input shaft via the second clutch and also variably connected to the transmission case via the first brake and the one-way clutch disposed in parallel.

The operating element rotating at the same speed with the common planet carrier may be the third planet carrier that is variably connected to the input shaft via the second clutch and also variably connected to the transmission case via the first brake and the one-way clutch.

The operating element rotating at the same speed with the common planet carrier may be the third planet carrier that is variably connected to the input shaft via the second clutch; and the second planet carrier may be variably connected to the transmission case via the first brake and the one-way clutch.

The operating element rotating at the same speed with the common planet carrier may be the third planet carrier that is variably connected to the transmission case via the first brake and the one-way clutch; and the common planet carrier may be variably connected to the input shaft via the second clutch.

The operating element rotating at the same speed with the common planet carrier may be the second planet carrier that is variably connected to the transmission case via the first brake and the one-way clutch; and the common planet carrier is variably connected to the input shaft via the second clutch.

A free first planet carrier may be connected with an output gear so as to act as an output element.

The first planet carrier fixedly connected with the second ring gear may be connected with an output gear so as to act as an output element.

The first clutch and the second clutch may be dividedly disposed to both exterior sides of the first and second single pinion planetary gear sets and the double pinion planetary gear set.

The first clutch and the second clutch may be disposed in parallel at an engine side of the first single pinion planetary gear set.

For the first forward speed, the second brake and the one-way clutch operate. For the second forward speed, the third brake operates from the state of the first forward speed. For the third forward speed, the third brake is released and the first clutch operates from the state of the second forward speed. For the fourth forward speed, the first clutch is released and the second clutch operates from the state of the third forward speed. For the fifth forward speed, the second brake is released and the first clutch operates from the state of the fourth forward speed. For the sixth forward speed, the first clutch is released and the third brake operates from the state of the fifth forward speed. For the reverse speed, the first clutch and the first brake operate.

The powertrain may be configured such that: the first and second single pinion planetary gear sets and the double pinion planetary gear set may be disposed in an order of the first single pinion planetary gear set, double pinion planetary gear set, and the second single pinion planetary gear set from an engine connected with an input shaft; the first sun gear is variably connected to the transmission case via the second brake; the first planet carrier acts as an output element; the second sun gear is variably connected to the input shaft via the first clutch and also variably connected to the transmission case via the third brake; and an operating element rotating at the same speed with the common planet carrier interconnecting the second and third planetary gears is variably connected to the input shaft via the second clutch and also variably connected to the transmission case via the first brake and the one-way clutch disposed in parallel.

The operating element rotating at the same speed with the common planet carrier may be the third planet carrier that is variably connected to the input shaft via the second clutch; and the second planet carrier may be variably connected to the transmission case via the first brake and the one-way clutch.

The operating element rotating at the same speed with the common planet carrier may be the second planet carrier that is variably connected to the transmission case via the first brake and the one-way clutch; and the common planet carrier is variably connected to the input shaft via the second clutch.

The first planet carrier fixedly connected with the second ring gear may be connected with an output gear so as to act as an output element.

The first clutch and the second clutch may be dividedly disposed to both exterior sides of the first and second single pinion planetary gear sets and the double pinion planetary gear set.

The first clutch and the second clutch may be respectively disposed exterior to the second single pinion planetary gear set and between the double pinion planetary gear set and the first single pinion planetary gear set.

The first clutch and the second clutch may be disposed in parallel at an exterior side of the second single pinion planetary gear set opposite to the engine.

For the first forward speed, the second brake and the one-way clutch operate. For the second forward speed, the third brake operates from the state of the first forward speed. For the third forward speed, the third brake is released and the first clutch operates from the state of the second forward speed. For the fourth forward speed, the first clutch is released and the second clutch operates from the state of the third forward speed. For the fifth forward speed, the second brake is released and the first clutch operates from the state of the fourth forward speed. For the sixth forward speed, the first clutch is released and the third brake operates from the state of the fifth forward speed. For the reverse speed, the first clutch and the first brake operate.

The powertrain may be configured such that: the first and second single pinion planetary gear sets and the double pinion planetary gear set are disposed in an order of the second single pinion planetary gear set, the double pinion planetary gear set, and the first single pinion planetary gear set from an engine connected with an input shaft; the first sun gear is variably connected to the transmission case via the second brake; the first planet carrier or the third ring gear fixedly connected thereto acts as an output element; the second sun gear is variably connected to the input shaft via the first clutch and also variably connected to the transmission case via the third brake; and an operating element rotating at the same speed with the common planet carrier interconnecting the second and third planetary gears is variably connected to the input shaft via the second clutch and also variably connected to the transmission case via the second brake and the one-way clutch disposed in parallel.

Operating element rotating at the same speed with the common planet carrier may be the third planet carrier that is variably connected to the input shaft via the second clutch; and the second planet carrier may be variably connected to the transmission case via the first brake and the one-way clutch.

The operating element rotating at the same speed with the common planet carrier may be the second planet carrier that is variably connected to the transmission case via the first brake and the one-way clutch; and the common planet carrier may be variably connected to the input shaft via the second clutch.

The third ring gear fixedly connected with the first planet carrier may be connected with an output gear so as to act as an output element.

A free first planet carrier may be connected with an output gear so as to act as an output element.

For the first forward speed, the second brake and the one-way clutch operate. For the second forward speed, the third brake operates from the state of the first forward speed. For the third forward speed, the third brake is released and the first clutch operates from the state of the second forward speed. For the fourth forward speed, the first clutch is released and the second clutch operates from the state of the third forward speed. For the fifth forward speed, the second brake is released and the first clutch operates from the state of the fourth forward speed. For the sixth forward speed, the first clutch is released and the third brake operates from the state of the fifth forward speed. For the reverse speed, the first clutch and the first brake operate.

The powertrain may be configured such that: the first and second single pinion planetary gear sets and the double pinion planetary gear set are disposed in an order of the first single pinion planetary gear set, the second single pinion planetary gear set, and the double pinion planetary gear set from an engine connected with an input shaft; the first sun gear is variably connected to the transmission case via the second brake, and the first planet carrier acts as an output element; the second sun gear is variably connected to the input shaft via the first clutch and also variably connected to the transmission case via the third brake; the third ring gear is variably connected to the input shaft via the second clutch; and the second planet carrier is variably connected to the transmission case via the first brake and one-way clutch.

A free first planet carrier may be connected with an output gear so as to act as an output element.

The first planet carrier fixedly connected with the second ring gear may be connected with an output gear so as to act as an output element.

For the first forward speed, the second brake and the one-way clutch operate. For the second forward speed, the third brake operates from the state of the first forward speed. For the third forward speed, the third brake is released and the first clutch operates from the state of the second forward speed. For the fourth forward speed, the first clutch is released and the second clutch operates from the state of the third forward speed. For the fifth forward speed, the second brake is released and the first clutch operates from the state of the fourth forward speed. For the sixth forward speed, the first clutch is released and the third brake operates from the state of the fifth forward speed. For the reverse speed, the first clutch and the first brake operate.

DETAILED DESCRIPTION OF THE EMBODIMENTS

Figures 1, 2:
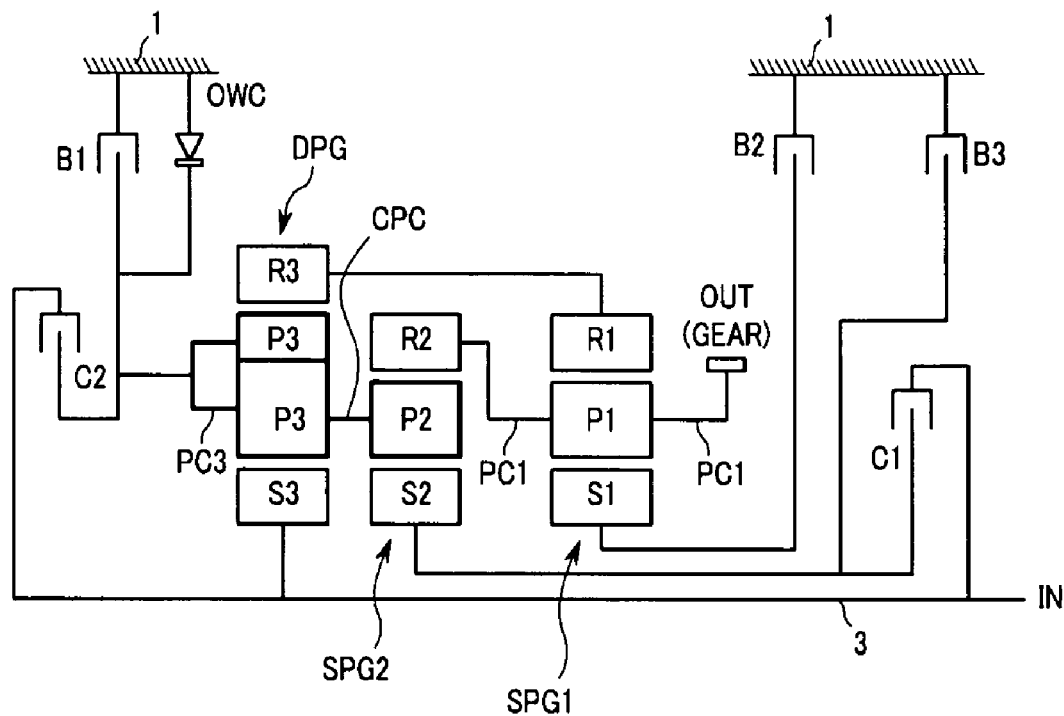
FIG. 1 is a schematic diagram of a powertrain according to a first exemplary embodiment of the present invention.
FIG. 2 is operational chart of frictional elements applicable to respective powertrains according to exemplary embodiments of the present invention.

Exemplary embodiments of the present invention will hereinafter be described in detail with reference to the accompanying drawings. Description of Reference Numerals Indicating Primary Elements in the Drawings:
1: Transmission case 3: Input shaft
S1, S2, S3: Sun gears P1, P2, P3: Planetary gears
R1, R2, R3: Ring gears PC1, PC2, PC3: Planet carriers
CPC: Common planet carrier
SPG1, SPG2: Single pinion planetary gear sets
DPG: Double pinion planetary gear set
C1, C2: Clutches
B1, B2, B3: brakes OWC: One-way clutch FIG. 1 is a schematic diagram of a powertrain according to a first exemplary embodiment of the present invention. The powertrain according to the first exemplary embodiment of the present invention realizes six forward speeds and one reverse speed by operating operational elements of two clutches and three brakes.

According to such a powertrain, a first single pinion planetary gear set SPG1 having a first sun gear S1, a first planetary gear P1, and a first ring gear R1 is disposed at a front side of an input shaft 3 that is connected to an engine through a torque converter.

A second single pinion planetary gear set SPG2 having a second sun gear S2, a second planetary gear P2, and a second ring gear R2 is disposed at a rear of the first single pinion planetary gear set SPG1.

A double pinion planetary gear set DPG having a third sun gear S3, a pair of third planetary gears P3, and a third ring gear R3 is disposed at a rear of the second single pinion planetary gear set SPG2.

That is, the first single pinion planetary gear set SPG1 is disposed forward in the transmission, the double pinion planetary gear set DPG is disposed rearward in the transmission, and the second single pinion planetary gear set SPG2 is disposed therebetween.

The first single pinion planetary gear set SPG1 includes the first sun gear S1, the first ring gear R1, and a pair of first planet carriers PC1 disposed at opposite sides of the first planetary gear P1 such that the first planetary gear P1 engaged between the first sun gear S1 and the first ring gear R1 is rotatably supported thereby.

The second single pinion planetary gear set SPG2 includes the second planetary gear P2 engaged between the second sun gear S2 and the second ring gear R2, however, it does not additionally include a second planet carrier.

The double pinion planetary gear set DPG includes the third sun gear S3, the third ring gear R3, and the pair of third planetary gears P3 engaged between the third sun gear S3 and the third ring gear R3. One of the pair of third planetary gears R3 is interconnected with an adjacent second planetary gear P2 of the second single pinion planetary gear set SPG2 by a common planet carrier CPC such that they may rotate independently.

In addition, the third ring gear R3 of the double pinion planetary gear set DPG is fixedly interconnected with the first ring gear R1 of the first single pinion planetary gear set SPG1 such that they may become integral.

In addition, the second ring gear R2 of the second single pinion planetary gear set SPG2 is fixedly interconnected with the first planet carrier PC1 of the first single pinion planetary gear set SPG1.

On the other hand, the third sun gear S3 of the third single pinion planetary gear set SPG3 is fixedly connected to the input shaft 3 so as to always receive a torque from the input shaft 3.

In more detail, regarding the first single pinion planetary gear set SPG1, the first sun gear S1 is variably connected to the transmission case 1 via a second brake B2.

In addition, the first planet carrier PC1 acts as an output element.

In addition, regarding the second single pinion planetary gear set SPG2, the second sun gear S2 is variably connected to the input shaft 3 via a first clutch C1, and at the same time, it is variably connected to the transmission case 1 via a third brake B3.

In addition, regarding double pinion planetary gear set DPG, a third planet carrier PC3 is variably connected to input shaft 3 via a second clutch C2, and at the same time it is also connected to the transmission case 1 via a first brake B1 and a one-way clutch OWC disposed in parallel such that the third planet carrier PC3 may act as an input element and a fixed element.

Here, an output gear OUTGEAR is connected to a free first planet carrier PC1 of the first single pinion planetary gear set SPG1 such that it may act as the output element.

The six-speed powertrain having such a configuration realizes six forward speeds and one reverse speed by operating according to the operational chart shown in FIG. 2. That is, for the first forward speed, the second brake B2 and the one-way clutch OWC operate. For the second forward speed, the one-way clutch OWC is released and the third brake B3 operates from the state of the first forward speed. For the third forward speed, the third brake B3 is released and the first clutch C1 operates from the state of the second forward speed. For the fourth forward speed, the first clutch C1 is released and the second clutch C2 operates from the state of the third forward speed.

In addition, for the fifth forward speed, the second brake B2 is released and the first clutch C1 operates from the state of the fourth forward speed. For the sixth forward speed, the first clutch C1 is released and the third brake B3 operates from the state of the fifth forward speed. For the reverse speed, the first clutch C1 and the first brake B1 operate.

Hereinafter, the shifting operation of the six-speed powertrain according to the first exemplary embodiment of the present invention will be described in detail with reference to FIG. 3 and FIG. 4 in further detail.

Figure 3:
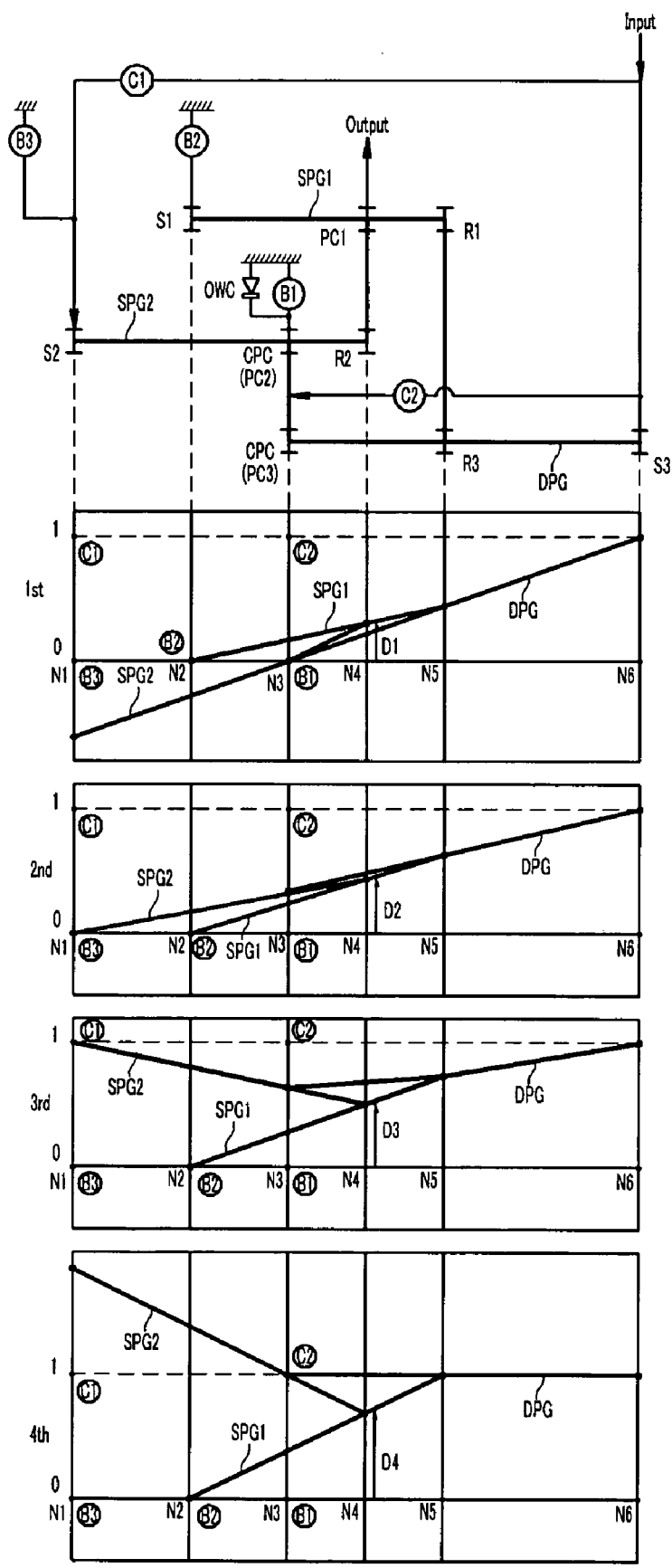
FIG. 3 is a shift diagram of the first to third forward speeds of a powertrain according to the first exemplary embodiment of the present invention.
Figure 4:
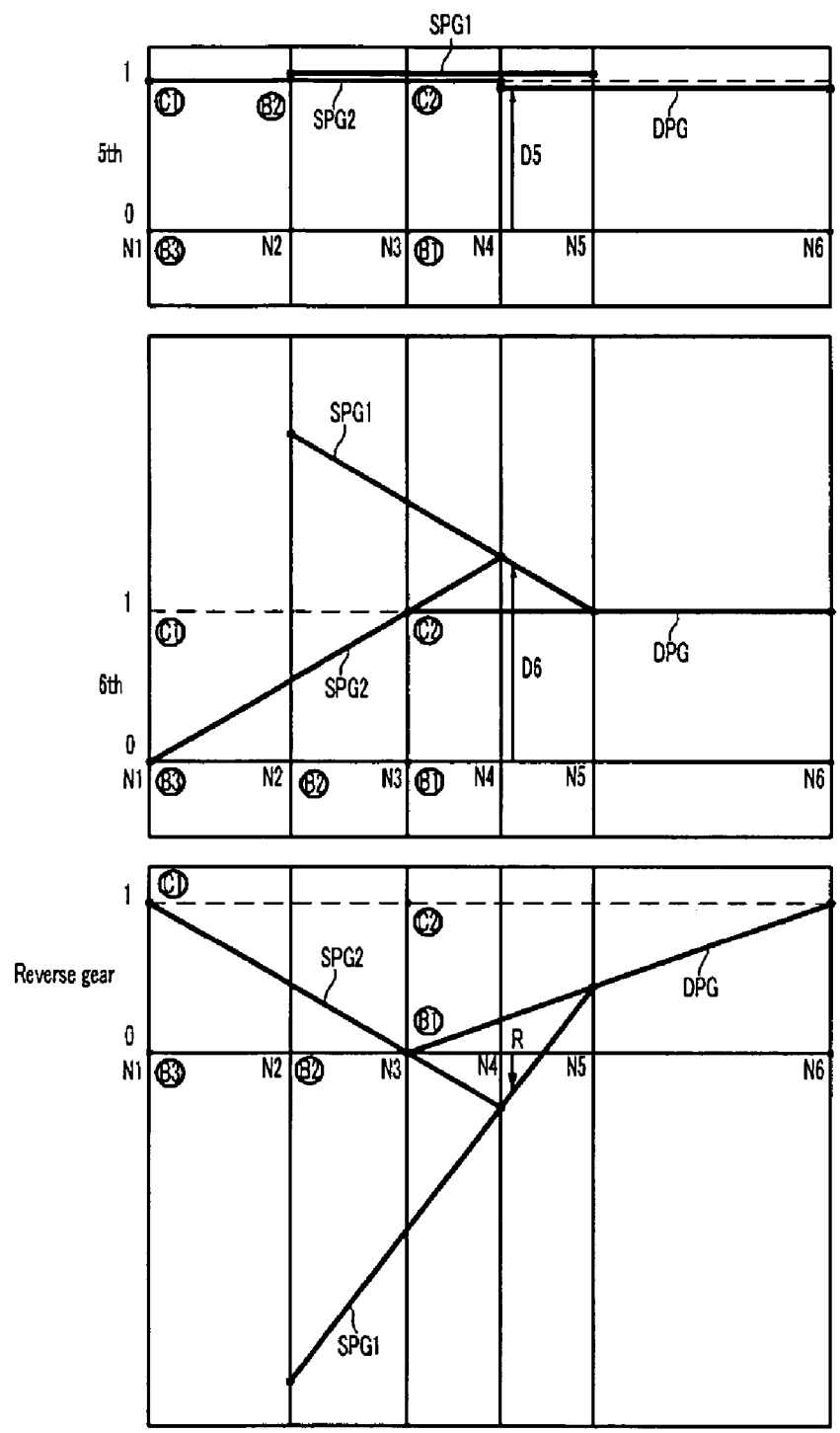
FIG. 4 is a shift diagram of the fourth to sixth forward speeds and the reverse speed of a powertrain according to the first exemplary embodiment of the present invention.

The operating elements are arranged at respective nodes as shown in FIG. 3 and FIG. 4 showing a shift diagram of the first to sixth forward speeds and the reverse speed of a powertrain according to exemplary embodiment of the present invention.

The second sun gear S2 forms a first node N1, the first sun gear S1 forms a second node N2, and the common planet carrier CPC forms a third node N3.

In addition, the first planet carrier PC1 and the second ring gear R2 commonly form a fourth node N4 that is an output node, the first ring gear R1 and the third ring gear R3 commonly form a fifth node N5, and the third sun gear S3 always receiving the input speed forms a sixth node N6.

When the third sun gear S3 of the sixth node N6 receives the input speed while the one-way clutch OWC and the second brake B2 are operating, both the second and third nodes N2 and N3 operate as fixed elements. In this case, according to cooperative reaction of the first and second single pinion planetary gear sets SPG1 and SPG2 and the double pinion planetary gear set DPG, three speed lines are formed as shown in a first speed diagram in FIG. 3. Therefore, the output element of the fourth node N4 rotates at a speed D1, and the shifting to the first forward speed is realized.

For the second forward speed, the third brake B1 operates from the state of the first forward speed.

Then, the third sun gear S3 of the sixth node N6 receives the input speed, and at the same time, the first and second nodes N1 and N2 act as fixed elements. In this case, according to cooperative reaction of the first and second single pinion planetary gear sets SPG1 and SPG2 and the double pinion planetary gear set DPG, three speed lines are formed as shown in a second speed diagram in FIG. 3. Therefore, the output element of the fourth node N4 rotates at a speed D2, and the shifting to the second forward speed is realized.

For the third forward speed, the third brake B3 is released and the first clutch C1 operates from the state of the second forward speed.

Then, the third sun gear S3 of the sixth node N6 receives the input speed, and at the same time, the second sun gear S2 of the first node N1 receives the same input speed.

In addition, the second node N2 remains as a fixed element. In this case, according to cooperative reaction of the first and second single pinion planetary gear sets SPG1 and SPG2 and the double pinion planetary gear set DPG, three speed lines are formed as shown in a third speed diagram in FIG. 3. Therefore, the output element of the fourth node N4 rotates at a speed D3, and the shifting to the third forward speed is realized.

For the fourth forward speed, the first clutch C1 is released and the second clutch C2 is controlled to operate from the state of the third forward speed.

Then, the third sun gear S3 of the sixth node N6 receives the input speed, and at the same time, the third node N3 receives the same input speed.

In addition, the second node N2 remains as a fixed element. Therefore, according to cooperative reaction of the first and second single pinion planetary gear sets SPG1 and SPG2 and the double pinion planetary gear set DPG, three speed lines are formed as shown in a fourth speed diagram in FIG. 3. Therefore, the output element of the fourth node N4 rotates at a speed D4, and the shifting to the fourth forward speed is realized.

For the fifth forward speed, the second brake B2 is released and the first clutch C1 operates again from the state of the fourth forward speed.

Then, the third sun gear S3 of the sixth node N6 receives the input speed, and at the same time, the third and first nodes N3 and N1 receive the same input speed.

That is, respective gears of the first and second single pinion planetary gear sets SPG1 and SPG2 and the double pinion planetary gear set DPG act as if they are fixedly interconnected. In this case, speed lines are formed at the same level with the input speed as shown in the fifth speed diagram in FIG. 4. Therefore, the output element of the fourth node N4 rotates at a speed D5, and the shifting to the fifth forward speed is realized.

For the sixth forward speed, the first clutch C1 is released and the third brake B3 is controlled to operate from the state of the fifth forward speed.

Then, the third sun gear S3 of the sixth node N6 receives the input speed, and at the same time, the third node N3 receives the same input speed.

In addition, the first node N1 acts as the fixed element. Therefore, according to cooperative reaction of the first and second single pinion planetary gear sets SPG1 and SPG2 and the double pinion planetary gear set DPG, three speed lines are formed as shown in a sixth speed diagram in FIG. 4. Therefore, the output element of the fourth node N4 rotates at a speed D6, and the shifting to the sixth forward speed is realized.

In addition, for the reverse speed, the first clutch C1 and the first brake B1 are controlled to operate.

Then, the third sun gear S3 of the sixth node N6 receives the input speed, and at the same time, the first node N1 receives the same input speed.

In addition, the third node N3 acts as the fixed element. Therefore, according to cooperative reaction of the first and second single pinion planetary gear sets SPG1 and SPG2 and the double pinion planetary gear set DPG, three speed lines are formed as shown in a reverse speed diagram in FIG. 4. Therefore, the output element of the fourth node N4 rotates at a speed R, and the shifting to the reverse speed is realized.

Hereinafter, the second exemplary embodiment of the present invention will be described in detail with reference to FIG. 5.

Figure 5:
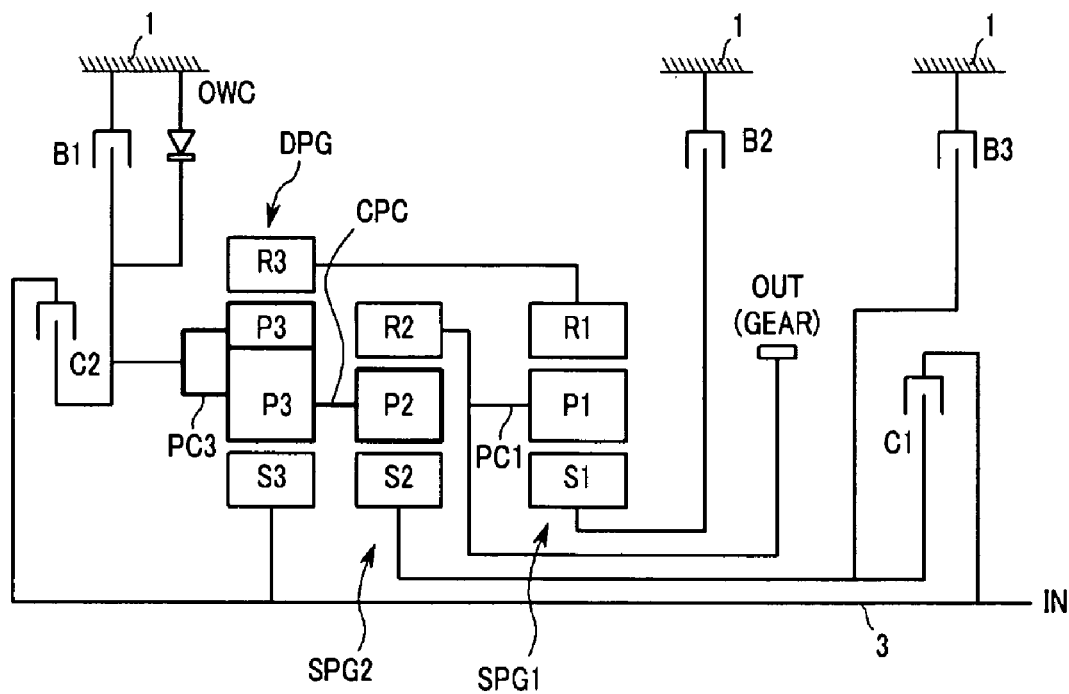
FIG. 5 is a schematic diagram of a powertrain according to a second exemplary embodiment of the present invention.

FIG. 5 is a schematic diagram of a powertrain according to a second exemplary embodiment of the present invention. According to the powertrain of the second exemplary embodiment of the present invention, the same as in the powertrain according to the first exemplary embodiment of the present invention, a first single pinion planetary gear set SPG1 is disposed at a front side of an input shaft 3 that is connected to an engine through a torque converter. The second single pinion planetary gear set SPG2 is disposed at a rear of the first single pinion planetary gear set SPG1, and the double pinion planetary gear set DPG is disposed at a rear of the second single pinion planetary gear set SPG2. The same as in the first exemplary embodiment, such planetary gear sets are configured to realize six forward speeds and one reverse speed by operating frictional elements of two clutches and three brakes.

In addition, the same as in the first exemplary embodiment, the first single pinion planetary gear set SPG1 is disposed forward in the transmission, the double pinion planetary gear set DPG is disposed rearward in the transmission, and the second single pinion planetary gear set SPG2 is disposed therebetween.

Also the same as in the first exemplary embodiment, five frictional elements are employed.

However, according to the second exemplary embodiment, differently from the first exemplary embodiment, the output gear OUTGEAR is connected with the first planet carrier PC1 that is fixedly connected with the second ring gear R2 of the second single pinion planetary gear set SPG2.

It is notable that, in the first exemplary embodiment, the output gear OUTGEAR was connected with the free first planet carrier PC1 of the first single pinion planetary gear set SPG1 so as to operate as the output element.

According to the second exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the second exemplary embodiment of the present invention is the same as have been described in connection with the first embodiment with reference to FIG. 3 and FIG. 4, and the description of the shift diagram shown in FIG. 3 and FIG. 4 may be referred to the above.

Hereinafter, the third exemplary embodiment of the present invention will be described in detail with reference to FIG. 6.

Figure 6:
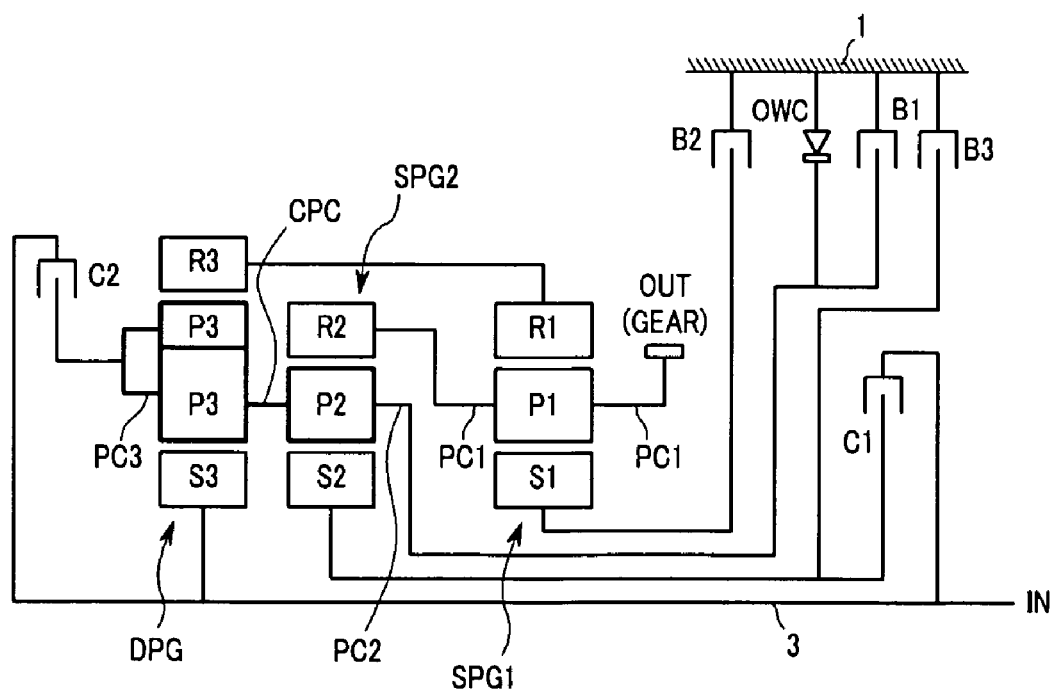
FIG. 6 is a schematic diagram of a powertrain according to a third exemplary embodiment of the present invention.

FIG. 6 is a schematic diagram of a powertrain according to a third exemplary embodiment of the present invention. According to the powertrain of the third exemplary embodiment of the present invention, the same as in the powertrain according to the first exemplary embodiment of the present invention, a first single pinion planetary gear set SPG1 is disposed at a front side of an input shaft 3 that is connected to an engine through a torque converter. The second single pinion planetary gear set SPG2 is disposed at a rear of the first single pinion planetary gear set SPG1, and the double pinion planetary gear set DPG is disposed at a rear of the second single pinion planetary gear set SPG2. The same as in the first exemplary embodiment, such planetary gear sets are configured to realize six forward speeds and one reverse speed by operating frictional elements of two clutches and three brakes.

In addition, the same as in the first exemplary embodiment, the first single pinion planetary gear set SPG1 is disposed forward (i.e., toward the engine) in the transmission, the double pinion planetary gear set DPG is disposed rearward in the transmission, and the second single pinion planetary gear set SPG2 is disposed therebetween.

Also the same as in the first exemplary embodiment, five frictional elements are employed.

However, according to the third exemplary embodiment, differently from the first exemplary embodiment, the third planet carrier PC3 is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3 may act as both an input element and a fixed element.

According to the third exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the third exemplary embodiment of the present invention is the same as have been described in connection with the first embodiment with reference to FIG. 3 and FIG. 4, and may be referred to the above description.

Hereinafter, the fourth exemplary embodiment of the present invention will be described in detail with reference to FIG. 7.

Figure 7:
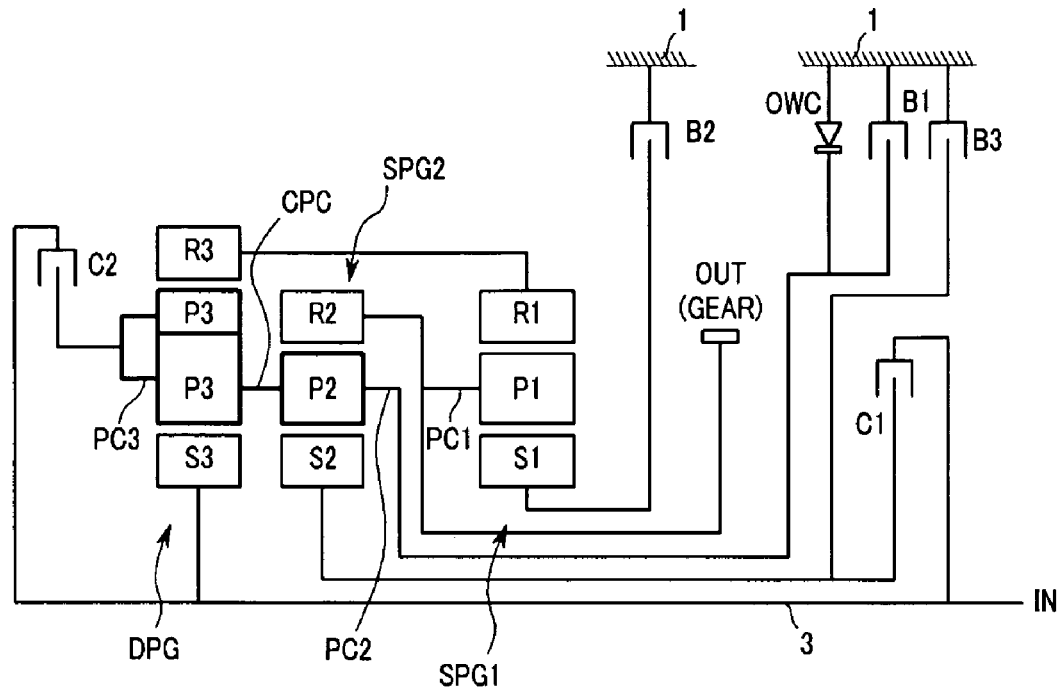
FIG. 7 is a schematic diagram of a powertrain according to a fourth exemplary embodiment of the present invention.

FIG. 7 is a schematic diagram of a powertrain according to a fourth exemplary embodiment of the present invention. According to the powertrain of the fourth exemplary embodiment of the present invention, the same as in the powertrain according to the first exemplary embodiment of the present invention, a first single pinion planetary gear set SPG1 is disposed at a front side of an input shaft 3 that is connected to an engine through a torque converter. The second single pinion planetary gear set SPG2 is disposed at a rear of the first single pinion planetary gear set SPG1, and the double pinion planetary gear set DPG is disposed at a rear of the second single pinion planetary gear set SPG2. The same as in the first exemplary embodiment, such planetary gear sets are configured to realize six forward speeds and one reverse speed by operating frictional elements of two clutches and three brakes.

In addition, the same as in the first exemplary embodiment, the first single pinion planetary gear set SPG1 is disposed forward (i.e., toward the engine) in the transmission, the double pinion planetary gear set DPG is disposed rearward in the transmission, and the second single pinion planetary gear set SPG2 is disposed therebetween.

Also the same as in the first exemplary embodiment, five frictional elements are employed.

However, according to the fourth exemplary embodiment, differently from the first exemplary embodiment, the output gear OUTGEAR is connected with the first planet carrier PC1 that is fixedly connected with the second ring gear R2 of the second single pinion planetary gear set SPG2.

It is notable that, in the first exemplary embodiment, the output gear OUTGEAR was connected with the free first planet carrier PC1 of the first single pinion planetary gear set SPG1 so as to operate as the output element.

According to the fourth exemplary embodiment, differently from the first exemplary embodiment, the third planet carrier PC3 is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the fourth exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the fourth exemplary embodiment of the present invention is the same as have been described in connection with the first embodiment with reference to FIG. 3 and FIG. 4, and the description thereof may be referred to the above.

Hereinafter, the fifth exemplary embodiment of the present invention will be described in detail with reference to FIG. 8.

Figure 8:
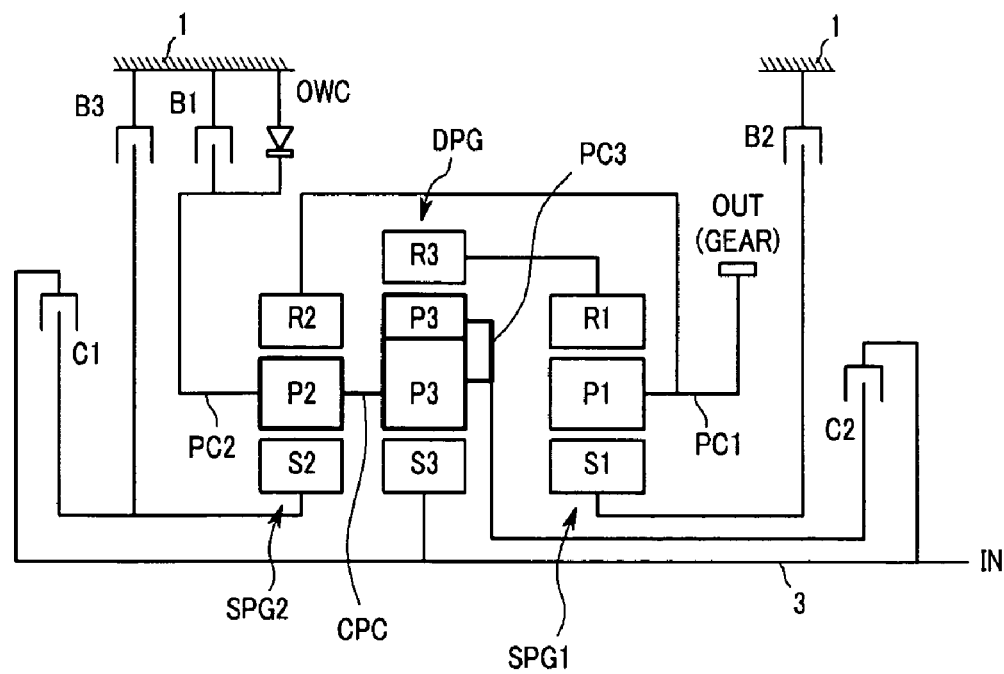
FIG. 8 is a schematic diagram of a powertrain according to a fifth exemplary embodiment of the present invention.

FIG. 8 is a schematic diagram of a powertrain according to a fifth exemplary embodiment of the present invention. According to the powertrain of the fifth exemplary embodiment of the present invention, a first single pinion planetary gear set SPG1 is disposed at a front side of an input shaft 3 that is connected to an engine through a torque converter. The double pinion planetary gear set DPG is disposed at a rear of the first single pinion planetary gear set SPG1, and the second single pinion planetary gear set SPG2 is disposed at a rear of the double pinion planetary gear set DPG. The same as in the first exemplary embodiment, such planetary gear sets are configured to realize six forward speeds and one reverse speed by operating frictional elements of two clutches and three brakes.

According to the fifth exemplary embodiment, the first single pinion planetary gear set SPG1 is disposed forward in the transmission, the second single pinion planetary gear set SPG2 is disposed rearward in the transmission, and the double pinion planetary gear set DPG is disposed therebetween.

Also the same as in the first exemplary embodiment, five frictional elements are employed.

However, according to the fifth exemplary embodiment, differently from the first exemplary embodiment, the third planet carrier PC3 is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the fifth exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the fifth exemplary embodiment of the present invention is the same as have been described in connection with the first embodiment with reference to FIG. 3 and FIG. 4, and the description thereof may be referred to the above.

Hereinafter, the sixth exemplary embodiment of the present invention will be described in detail with reference to FIG. 9.

Figure 9:
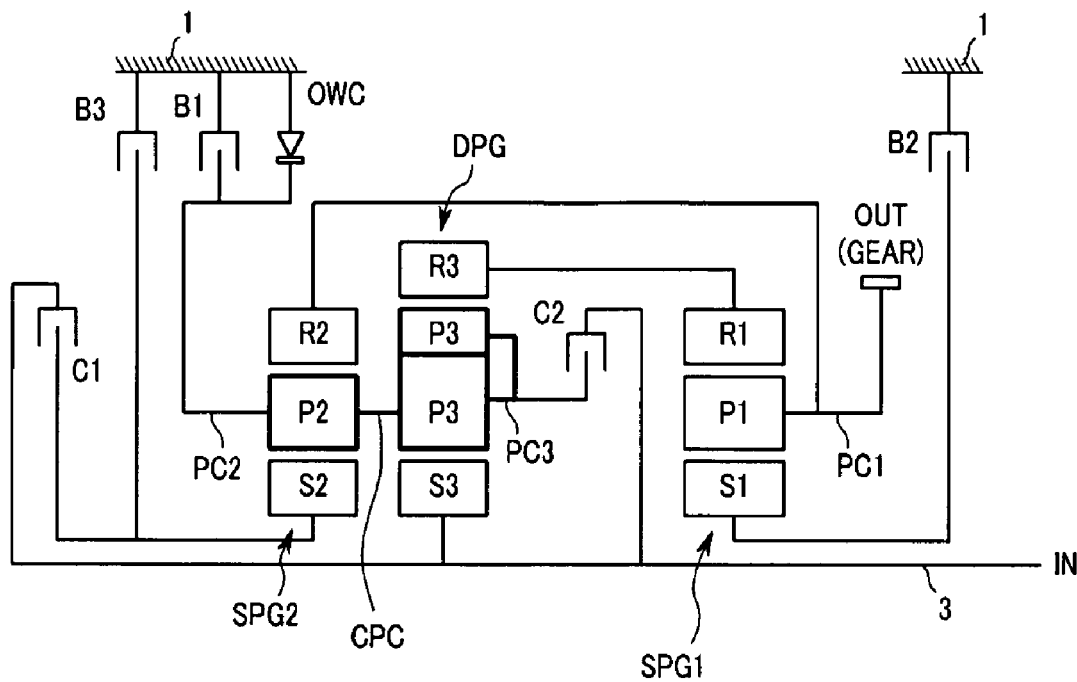
FIG. 9 is a schematic diagram of a powertrain according to a sixth exemplary embodiment of the present invention.

FIG. 9 is a schematic diagram of a powertrain according to a sixth exemplary embodiment of the present invention. According to the powertrain of the sixth exemplary embodiment of the present invention, a first single pinion planetary gear set SPG1 is disposed at a front side of an input shaft 3 that is connected to an engine through a torque converter. The double pinion planetary gear set DPG is disposed at a rear of the first single pinion planetary gear set SPG1, and the second single pinion planetary gear set SPG2 is disposed at a rear of the double pinion planetary gear set DPG. The same as in the first exemplary embodiment, such planetary gear sets are configured to realize six forward speeds and one reverse speed by operating frictional elements of two clutches and three brakes.

In addition, the same as in the first exemplary embodiment, the first single pinion planetary gear set SPG1 is disposed forward in the transmission, the second single pinion planetary gear set SPG2 is disposed rearward in the transmission, and the double pinion planetary gear set DPG is disposed therebetween.

Also the same as in the first exemplary embodiment, five frictional elements are employed.

However, according to the sixth exemplary embodiment, differently from the first exemplary embodiment, the third planet carrier PC3 is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

In addition, according to the first, second, third, fourth, and fifth exemplary embodiments, the first clutch C1 and the second clutch C2 are dividedly disposed to both exterior sides of the first and second single pinion planetary gear sets SPG1 and SPG2 and the double pinion planetary gear set DPG. However, according to the sixth exemplary embodiment, the first clutch C1 is disposed exterior to the second single pinion planetary gear set SPG2, and the second clutch C2 is disposed between the double pinion planetary gear set DPG and the first single pinion planetary gear set SPG1.

According to the sixth exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the sixth exemplary embodiment of the present invention is the same as have been described in connection with the first embodiment with reference to FIG. 3 and FIG. 4, and the description thereof may be referred to the above.

Hereinafter, the seventh exemplary embodiment of the present invention will be described in detail with reference to FIG. 10.

Figure 10:
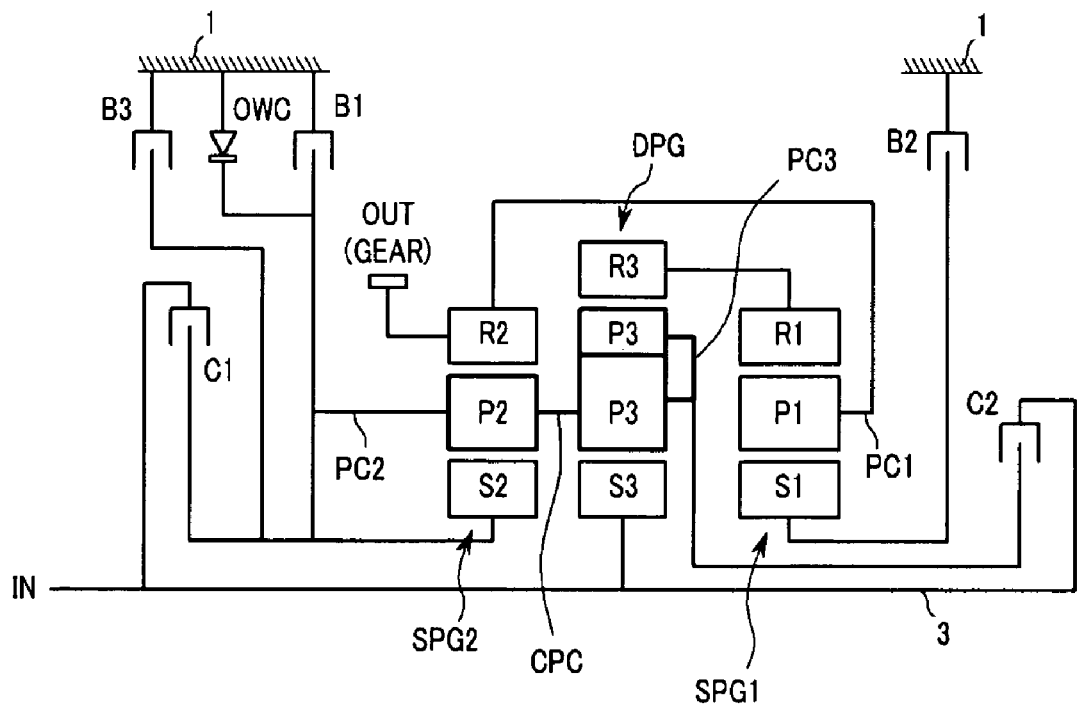
FIG. 10 is a schematic diagram of a powertrain according to a seventh exemplary embodiment of the present invention.

FIG. 10 is a schematic diagram of a powertrain according to a seventh exemplary embodiment of the present invention.

According to the powertrain of the seventh exemplary embodiment of the present invention, the second single pinion planetary gear set SPG2 is disposed at a front side on the input shaft 3 that is connected with an engine output side through a torque converter. The double pinion planetary gear set DPG is disposed at a rear of the second single pinion planetary gear set SPG2, and the first single pinion planetary gear set SPG1 is disposed at a rear of the double pinion planetary gear set DPG. The same as in the first exemplary embodiment, such planetary gear sets are configured to realize six forward speeds and one reverse speed by operating frictional elements of two clutches and three brakes.

In addition, according to the seventh exemplary embodiment, the same as in the first exemplary embodiment, the second single pinion planetary gear set SPG2 is disposed forward in the transmission, the first single pinion planetary gear set SPG1 is disposed rearward in the transmission, and the double pinion planetary gear set DPG is disposed therebetween.

However, according to the seventh exemplary embodiment, differently from the first exemplary embodiment, the output gear OUTGEAR is connected to the second ring gear R2 of the second single pinion planetary gear set SPG2.

It is notable that, in the first exemplary embodiment, the output gear OUTGEAR is connected to the free first planet carrier PC1 of the first single pinion planetary gear set SPG1 that is operating as the output element.

In addition, according to the seventh exemplary embodiment, differently from the first exemplary embodiment, the third planet carrier PC3 is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the seventh exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the seventh exemplary embodiment of the present invention is the same as have been described in connection with the first embodiment with reference to FIG. 3 and FIG. 4, and the description thereof may be referred to the above.

Hereinafter, the eighth exemplary embodiment of the present invention will be described in detail with reference to FIG. 11.

Figure 11:
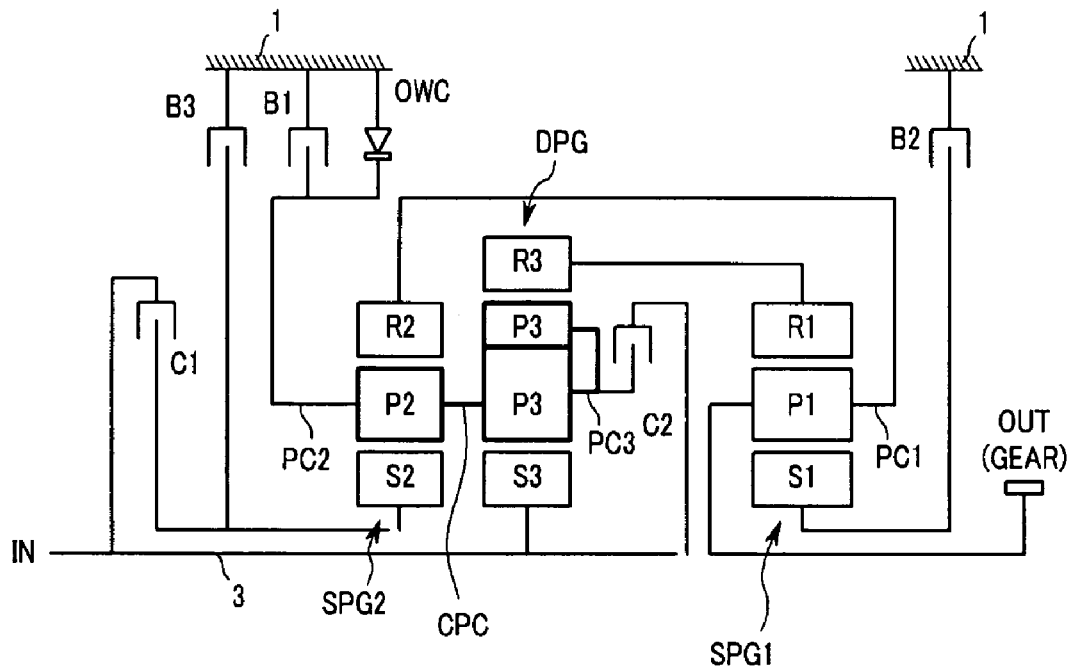
FIG. 11 is a schematic diagram of a powertrain according to an eighth exemplary embodiment of the present invention.

FIG. 11 is a schematic diagram of a powertrain according to an eighth exemplary embodiment of the present invention. According to the powertrain of the eighth exemplary embodiment of the present invention, the second single pinion planetary gear set SPG2 is disposed at a front side on the input shaft 3 that is connected with an engine output side through a torque converter. The double pinion planetary gear set DPG is disposed at a rear of the second single pinion planetary gear set SPG2, and the first single pinion planetary gear set SPG1 is disposed at a rear of the double pinion planetary gear set DPG. The same as in the first exemplary embodiment, such planetary gear sets are configured to realize six forward speeds and one reverse speed by operating frictional elements of two clutches and three brakes.

According to the eighth exemplary embodiment, the same as in the first exemplary embodiment, the second single pinion planetary gear set SPG2 is disposed forward in the transmission, the first single pinion planetary gear set SPG1 is disposed rearward in the transmission, and the double pinion planetary gear set DPG is disposed therebetween.

Also the same as in the first exemplary embodiment, five frictional elements are employed.

However, according to the eighth exemplary embodiment, differently from the first exemplary embodiment, the third planet carrier PC3 is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

In addition, according to the first, second, third, fourth, fifth, and seventh exemplary embodiments, the first clutch C1 and the second clutch C2 are dividedly disposed to both exterior sides of the first and second single pinion planetary gear sets SPG1 and SPG2 and the double pinion planetary gear set DPG. However, according to the eighth exemplary embodiment, the first clutch C1 is disposed exterior to the second single pinion planetary gear set SPG2, and the second clutch C2 is disposed between the double pinion planetary gear set DPG and the first single pinion planetary gear set SPG1.

According to the eighth exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the eighth exemplary embodiment of the present invention is the same as have been described in connection with the first embodiment with reference to FIG. 3 and FIG. 4, and the description thereof may be referred to the above.

Hereinafter, the ninth exemplary embodiment of the present invention will be described in detail with reference to FIG. 12.

Figure 12:
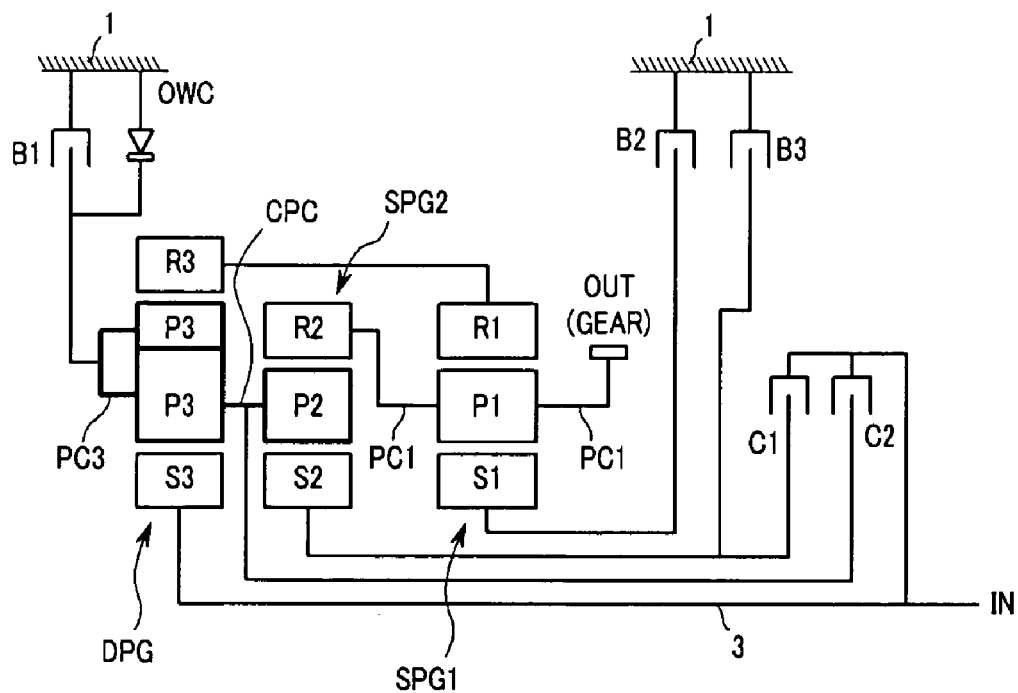
FIG. 12 is a schematic diagram of a powertrain according to a ninth exemplary embodiment of the present invention.

FIG. 12 is a schematic diagram of a powertrain according to a ninth exemplary embodiment of the present invention. According to the powertrain of the ninth exemplary embodiment of the present invention, the same as in the powertrain according to the first exemplary embodiment of the present invention, a first single pinion planetary gear set SPG1 is disposed at a front side of an input shaft 3 that is connected to an engine through a torque converter. The second single pinion planetary gear set SPG2 is disposed at a rear of the first single pinion planetary gear set SPG1, and the double pinion planetary gear set DPG is disposed at a rear of the second single pinion planetary gear set SPG2. The same as in the first exemplary embodiment, such planetary gear sets are configured to realize six forward speeds and one reverse speed by operating frictional elements of two clutches and three brakes.

In addition, according to the eighth exemplary embodiment, the same as in the first exemplary embodiment, the first single pinion planetary gear set SPG1 is disposed forward (i.e., toward the engine) in the transmission, the double pinion planetary gear set DPG is disposed rearward in the transmission, and the second single pinion planetary gear set SPG2 is disposed therebetween.

Also the same as in the first exemplary embodiment, five frictional elements are employed.

However, according to the ninth exemplary embodiment, differently from the first exemplary embodiment, the first clutch C1 and the second clutch C2 are disposed forwardly (i.e., toward the engine) exterior to the first single pinion planetary gear set SPG1.

It is notable that, in the first exemplary embodiment, the first clutch C1 and the second clutch C2 are dividedly disposed to both exterior sides of the first and second single pinion planetary gear sets SPG1 and SPG2 and the double pinion planetary gear set DPG.

In addition, according to the ninth exemplary embodiment, differently from the first exemplary embodiment, the common planet carrier CPC is variably connected to the input shaft 3 via the second clutch C2, and the third planet carrier PC3 is variably connected to the transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the ninth exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the ninth exemplary embodiment of the present invention is the same as have been described in connection with the first embodiment with reference to FIG. 3 and FIG. 4, and the description thereof may be referred to the above.

Hereinafter, the tenth exemplary embodiment of the present invention will be described in detail with reference to FIG. 13.

Figure 13:
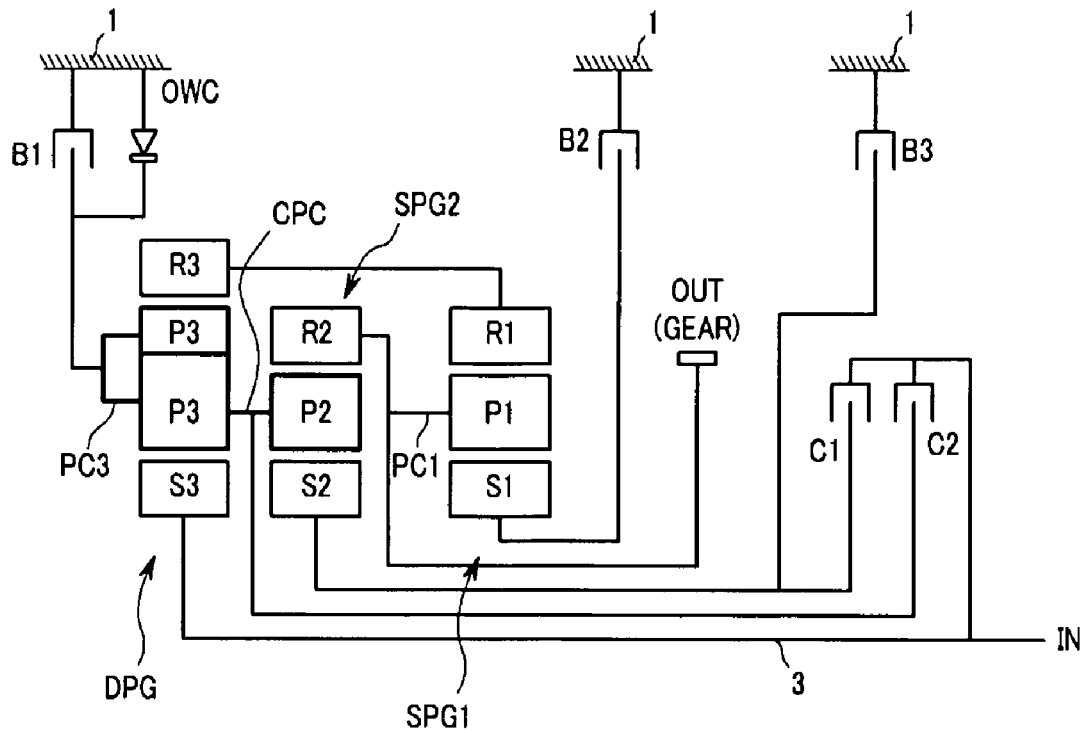
FIG. 13 is a schematic diagram of a powertrain according to a tenth exemplary embodiment of the present invention.

FIG. 13 is a schematic diagram of a powertrain according to a tenth exemplary embodiment of the present invention. According to the powertrain of the tenth exemplary embodiment of the present invention, the same as in the powertrain according to the first exemplary embodiment of the present invention, a first single pinion planetary gear set SPG1 is disposed at a front side of an input shaft 3 that is connected to an engine through a torque converter. The second single pinion planetary gear set SPG2 is disposed at a rear of the first single pinion planetary gear set SPG1, and the double pinion planetary gear set DPG is disposed at a rear of the second single pinion planetary gear set SPG2. The same as in the first exemplary embodiment, such planetary gear sets are configured to realize six forward speeds and one reverse speed by operating frictional elements of two clutches and three brakes.

According to the tenth exemplary embodiment, the same as in the first exemplary embodiment, the first single pinion planetary gear set SPG1 is disposed forward (i.e., toward the engine) in the transmission, the double pinion planetary gear set DPG is disposed rearward in the transmission, and the second single pinion planetary gear set SPG2 is disposed therebetween.

Also the same as in the first exemplary embodiment, five frictional elements are employed.

However, according to the tenth exemplary embodiment, differently from the first exemplary embodiment, the output gear OUTGEAR is connected to the first planet carrier PC1 that is fixedly connected with the second ring gear R2 of the second single pinion planetary gear set SPG2.

It is notable that, in the first exemplary embodiment, the output gear OUTGEAR is connected to the free first planet carrier PC1 of the first single pinion planetary gear set SPG1 that is operating as the output element.

According to the tenth exemplary embodiment, differently from the first exemplary embodiment, the first clutch C1 and the second clutch C2 are disposed forwardly (i.e., toward the engine) exterior to the first single pinion planetary gear set SPG1.

It is notable that, in the first exemplary embodiment, the first clutch C1 and the second clutch C2 are dividedly disposed to both exterior sides of the first and second single pinion planetary gear sets SPG1 and SPG2 and the double pinion planetary gear set DPG.

In addition, according to the tenth exemplary embodiment, differently from the first exemplary embodiment, the common planet carrier CPC is variably connected to the input shaft 3 via the second clutch C2, and the third planet carrier PC3 is variably connected to the transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the tenth exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the tenth exemplary embodiment of the present invention is the same as have been described in connection with the first embodiment with reference to FIG. 3 and FIG. 4, and the description thereof may be referred to the above.

Hereinafter, the eleventh exemplary embodiment of the present invention will be described in detail with reference to FIG. 14.

Figure 14:
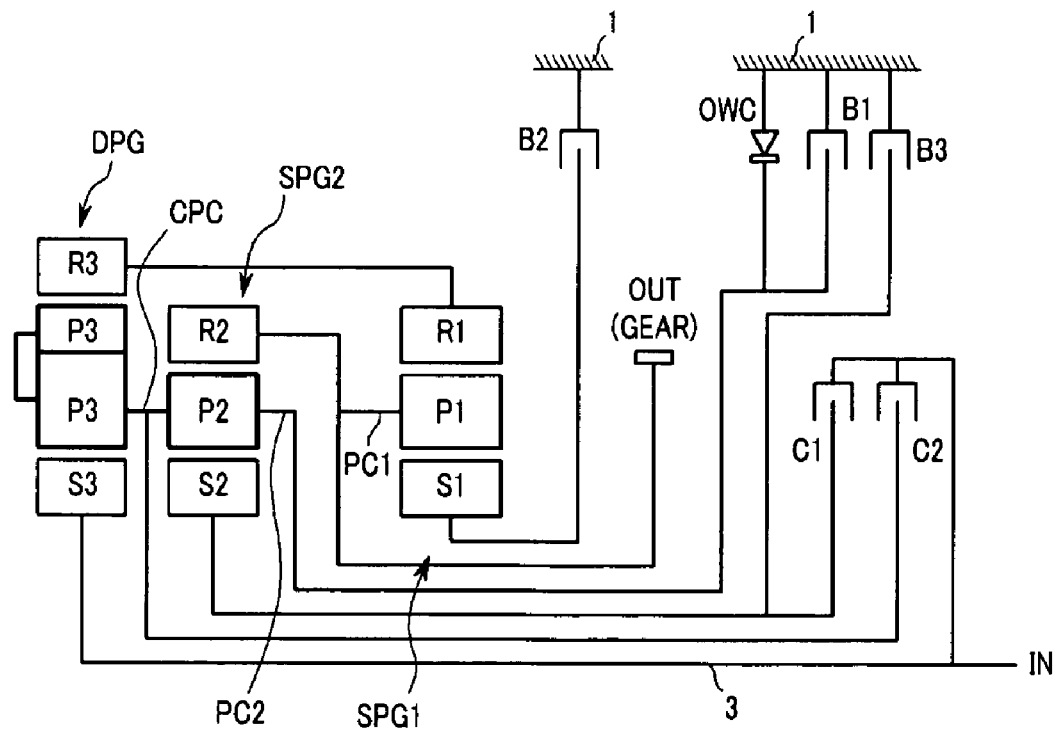
FIG. 14 is a schematic diagram of a powertrain according to an eleventh exemplary embodiment of the present invention.

FIG. 14 is a schematic diagram of a powertrain according to an eleventh exemplary embodiment of the present invention. According to the powertrain of the eleventh exemplary embodiment of the present invention, the same as in the powertrain according to the first exemplary embodiment of the present invention, a first single pinion planetary gear set SPG1 is disposed at a front side of an input shaft 3 that is connected to an engine through a torque converter. The second single pinion planetary gear set SPG2 is disposed at a rear of the first single pinion planetary gear set SPG1, and the double pinion planetary gear set DPG is disposed at a rear of the second single pinion planetary gear set SPG2. The same as in the first exemplary embodiment, such planetary gear sets are configured to realize six forward speeds and one reverse speed by operating frictional elements of two clutches and three brakes.

According to the eleventh exemplary embodiment, the same as in the first exemplary embodiment, the first single pinion planetary gear set SPG1 is disposed forward (i.e., toward the engine) in the transmission, the double pinion planetary gear set DPG is disposed rearward in the transmission, and the second single pinion planetary gear set SPG2 is disposed therebetween.

Also the same as in the first exemplary embodiment, five frictional elements are employed in the same interconnection scheme.

However, according to the eleventh exemplary embodiment, differently from the first exemplary embodiment, the output gear OUTGEAR is connected to the first planet carrier PC1 that is fixedly connected with the second ring gear R2 of the second single pinion planetary gear set SPG2.

It is notable that, in the first exemplary embodiment, the output gear OUTGEAR is connected to the free first planet carrier PC1 of the first single pinion planetary gear set SPG1 that is operating as the output element.

In addition, according to the eleventh exemplary embodiment, differently from the first exemplary embodiment, the first clutch C1 and the second clutch C2 are disposed forwardly (i.e., toward the engine) exterior to the first single pinion planetary gear set SPG1.

It is notable that, in the first exemplary embodiment, the first clutch C1 and the second clutch C2 are dividedly disposed to both exterior sides of the first and second single pinion planetary gear sets SPG1 and SPG2 and the double pinion planetary gear set DPG.

In addition, according to the eleventh exemplary embodiment, differently from the first exemplary embodiment, the common planet carrier CPC is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the eleventh exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the eleventh exemplary embodiment of the present invention is the same as have been described in connection with the first embodiment with reference to FIG. 3 and FIG. 4, and the description thereof may be referred to the above.

Hereinafter, the twelfth exemplary embodiment of the present invention will be described in detail with reference to FIG. 15.

Figure 15:
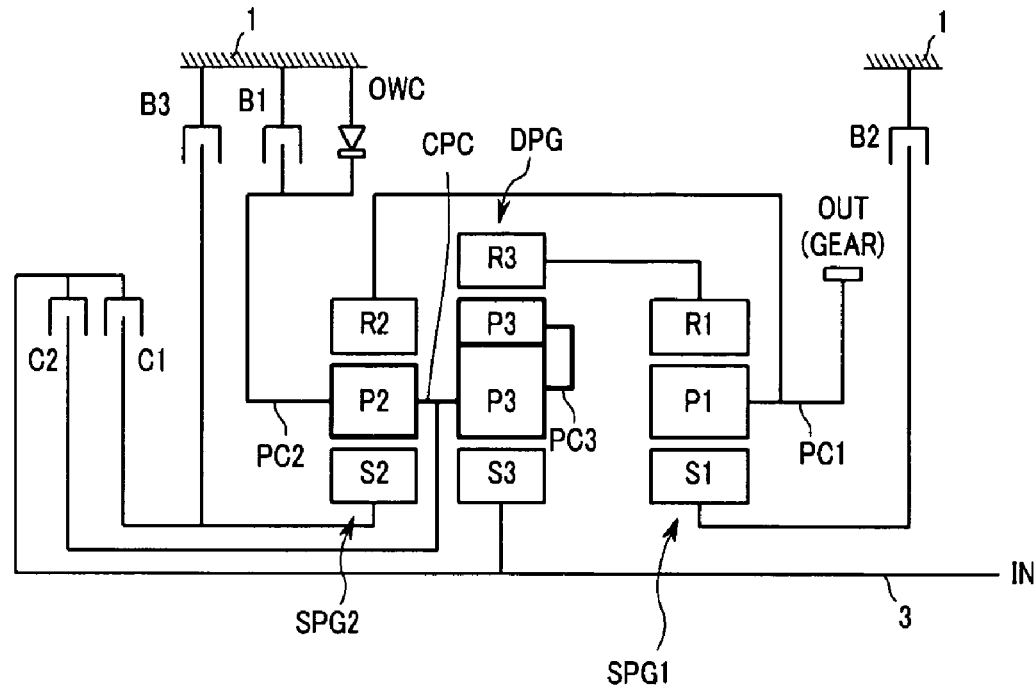
FIG. 15 is a schematic diagram of a powertrain according to a twelfth exemplary embodiment of the present invention.

FIG. 15 is a schematic diagram of a powertrain according to a twelfth exemplary embodiment of the present invention. According to the powertrain of the twelfth exemplary embodiment of the present invention, a first single pinion planetary gear set SPG1 is disposed at a front side of an input shaft 3 that is connected to an engine through a torque converter. The double pinion planetary gear set DPG is disposed at a rear of the first single pinion planetary gear set SPG1, and the second single pinion planetary gear set SPG2 is disposed at a rear of the double pinion planetary gear set DPG.

The same as in the first exemplary embodiment, such planetary gear sets are configured to realize six forward speeds and one reverse speed by operating frictional elements of two clutches and three brakes.

However, according to the twelfth exemplary embodiment, differently from the first exemplary embodiment, the first single pinion planetary gear set SPG1 is disposed forward in the transmission, the second single pinion planetary gear set SPG2 is disposed rearward in the transmission, and the double pinion planetary gear set DPG is disposed therebetween.

However, the same as in the first exemplary embodiment, five frictional elements are employed in the twelfth embodiment.

According to the twelfth exemplary embodiment, differently from the first exemplary embodiment, the common planet carrier CPC is variably connected to the input shaft 3 via the second clutch C2, and a second planet carrier PC2 is variably connected to transmission case 1 via the first brake B1 and the one-way clutch OWC.

It is notable that, according to the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the twelfth exemplary embodiment, differently from the first exemplary embodiment, the first clutch C1 and the second clutch C2 are exteriorly disposed rearward (i.e., opposite to the engine) to the second single pinion planetary gear set SPG2.

It is notable that, in the first exemplary embodiment, the first clutch C1 and the second clutch C2 are dividedly disposed to both exterior sides of the first and second single pinion planetary gear sets SPG1 and SPG2 and the double pinion planetary gear set DPG.

According to the twelfth exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the twelfth exemplary embodiment of the present invention is the same as have been described in connection with the first embodiment with reference to FIG. 3 and FIG. 4, and the description thereof may be referred to the above.

Hereinafter, the thirteenth exemplary embodiment of the present invention will be described in detail with reference to FIG. 16.

Figure 16:
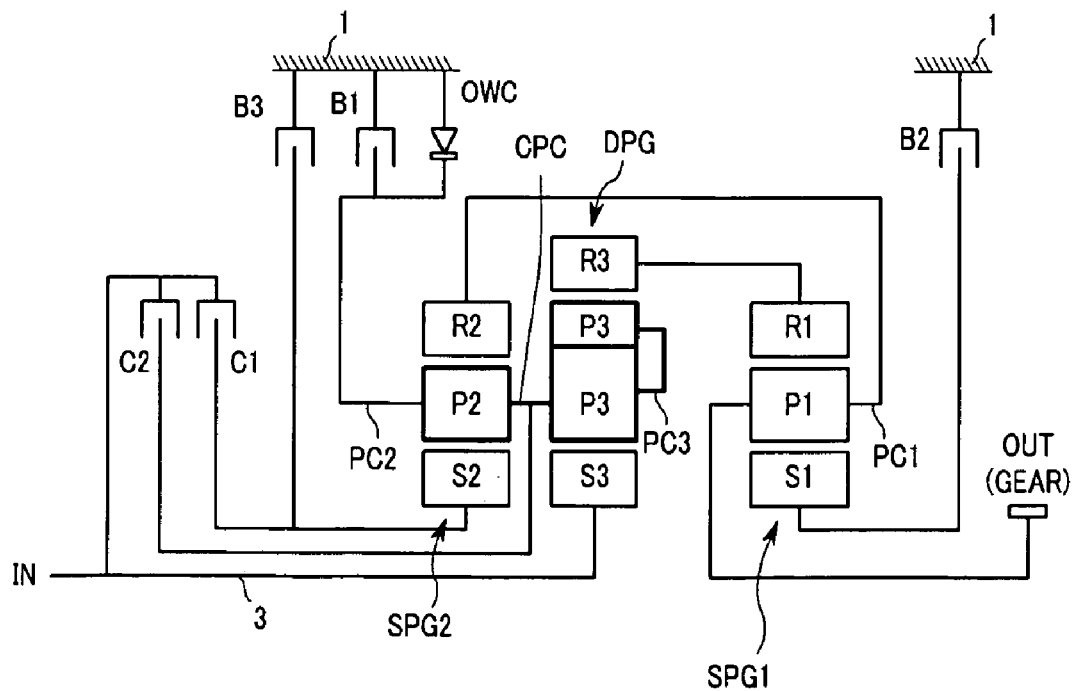
FIG. 16 is a schematic diagram of a powertrain according to a thirteenth exemplary embodiment of the present invention.

FIG. 16 is a schematic diagram of a powertrain according to a thirteenth exemplary embodiment of the present invention. According to the powertrain of the thirteenth exemplary embodiment of the present invention, the second single pinion planetary gear set SPG2 is disposed at a front side on the input shaft 3 that is connected with an engine output side through a torque converter. The double pinion planetary gear set DPG is disposed at a rear of the second single pinion planetary gear set SPG2, and the first single pinion planetary gear set SPG1 is disposed at a rear of the double pinion planetary gear set DPG. The same as in the first exemplary embodiment, such planetary gear sets are configured to realize six forward speeds and one reverse speed by operating frictional elements of two clutches and three brakes.

According to the thirteenth exemplary embodiment, differently from the first exemplary embodiment, the second single pinion planetary gear set SPG2 is disposed forward in the transmission, the first single pinion planetary gear set SPG1 is disposed rearward in the transmission, and the double pinion planetary gear set DPG is disposed therebetween.

However, the same as in the first exemplary embodiment, five frictional elements are employed in the thirteenth embodiment.

According to the thirteenth exemplary embodiment, differently from the first exemplary embodiment, the common planet carrier CPC is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the thirteenth exemplary embodiment, differently from the first exemplary embodiment, the first clutch C1 and the second clutch C2 are disposed forwardly (i.e., toward the engine) exterior to the second single pinion planetary gear set SPG2.

It is notable that, in the first exemplary embodiment, the first clutch C1 and the second clutch C2 are dividedly disposed to both exterior sides of the first and second single pinion planetary gear sets SPG1 and SPG2 and the double pinion planetary gear set DPG.

According to the thirteenth exemplary embodiment, torque of the input shaft 3 is transmitted to the first and second single pinion planetary gear sets SPG1 and SPG2 and the double pinion planetary gear set DPG using the combination of the five frictional elements in the same route as the first exemplary embodiment. Also, the operational chart of the frictional elements is the same as shown in FIG. 2 in connection with the first exemplary embodiment.

Therefore, a shifting operation of the powertrain according to the thirteenth exemplary embodiment of the present invention is the same as have been described in connection with the first embodiment with reference to FIG. 3 and FIG. 4, and the description thereof may be referred to the above.

Hereinafter, the fourteenth exemplary embodiment of the present invention will be described in detail with reference to FIG. 17.

Figure 17:
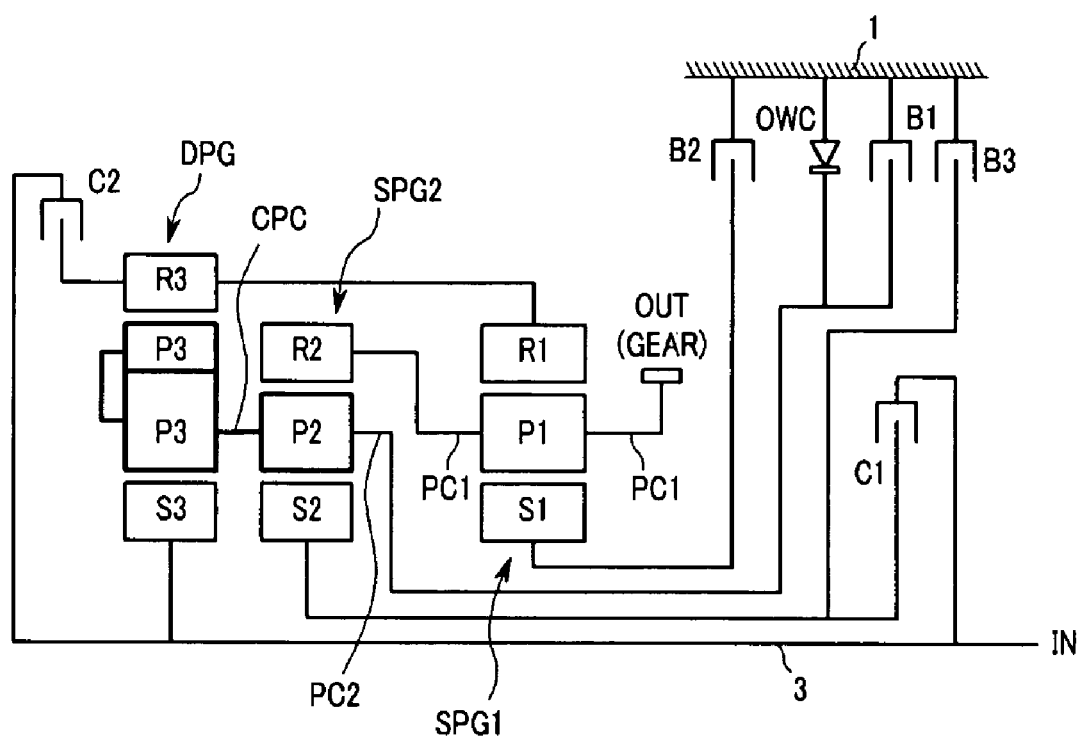
FIG. 17 is a schematic diagram of a powertrain according to a fourteenth exemplary embodiment of the present invention.

FIG. 17 is a schematic diagram of a powertrain according to a fourteenth exemplary embodiment of the present invention. According to the powertrain of the fourteenth exemplary embodiment of the present invention, the same as in the powertrain according to the first exemplary embodiment of the present invention, a first single pinion planetary gear set SPG1 is disposed at a front side of an input shaft 3 that is connected to an engine through a torque converter. The second single pinion planetary gear set SPG2 is disposed at a rear of the first single pinion planetary gear set SPG1, and the double pinion planetary gear set DPG is disposed at a rear of the second single pinion planetary gear set SPG2. The same as in the first exemplary embodiment, such planetary gear sets are configured to realize six forward speeds and one reverse speed by operating frictional elements of two clutches and three brakes.

According to the fourteenth exemplary embodiment, the same as in the first exemplary embodiment, the first single pinion planetary gear set SPG1 is disposed forward (i.e., toward the engine) in the transmission, the double pinion planetary gear set DPG is disposed rearward in the transmission, and the second single pinion planetary gear set SPG2 is disposed therebetween.

Also the same as in the first exemplary embodiment, five frictional elements are employed.

However, according to the fourteenth exemplary embodiment, differently from the first exemplary embodiment, the third ring gear R3 is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the fourteenth exemplary embodiment, torque of the input shaft 3 is transmitted to the first and second single pinion planetary gear sets SPG1 and SPG2 and the double pinion planetary gear set DPG using the combination of the five frictional elements in a slightly different route from the first exemplary embodiment. However, the operational chart of the frictional elements is the same as shown in FIG. 2 in connection with the first exemplary embodiment.

Figure 18:
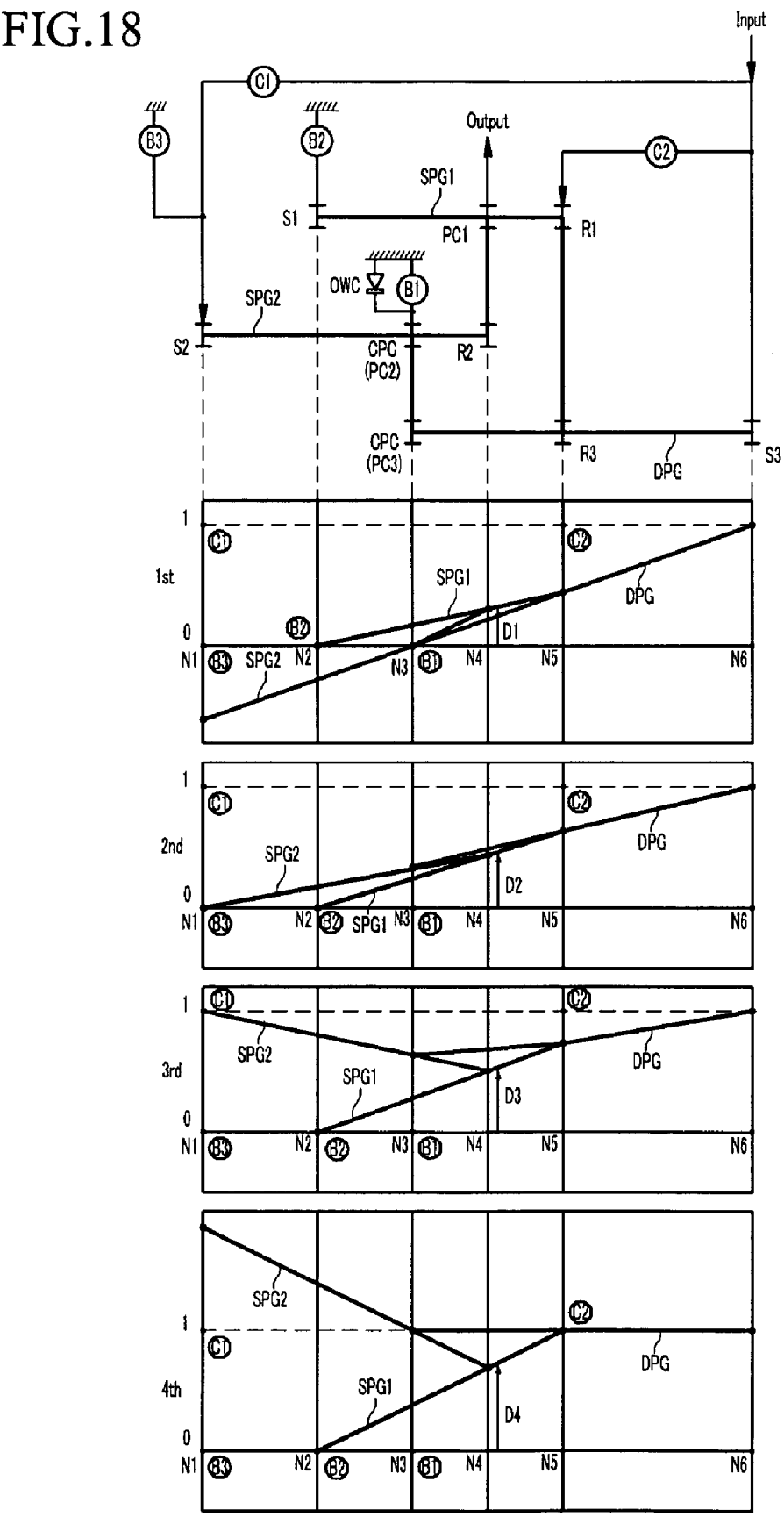
FIG. 18 is a shift diagram of the first to third forward speeds of a powertrain according to the fourteenth exemplary embodiment of the present invention.
Figure 19:
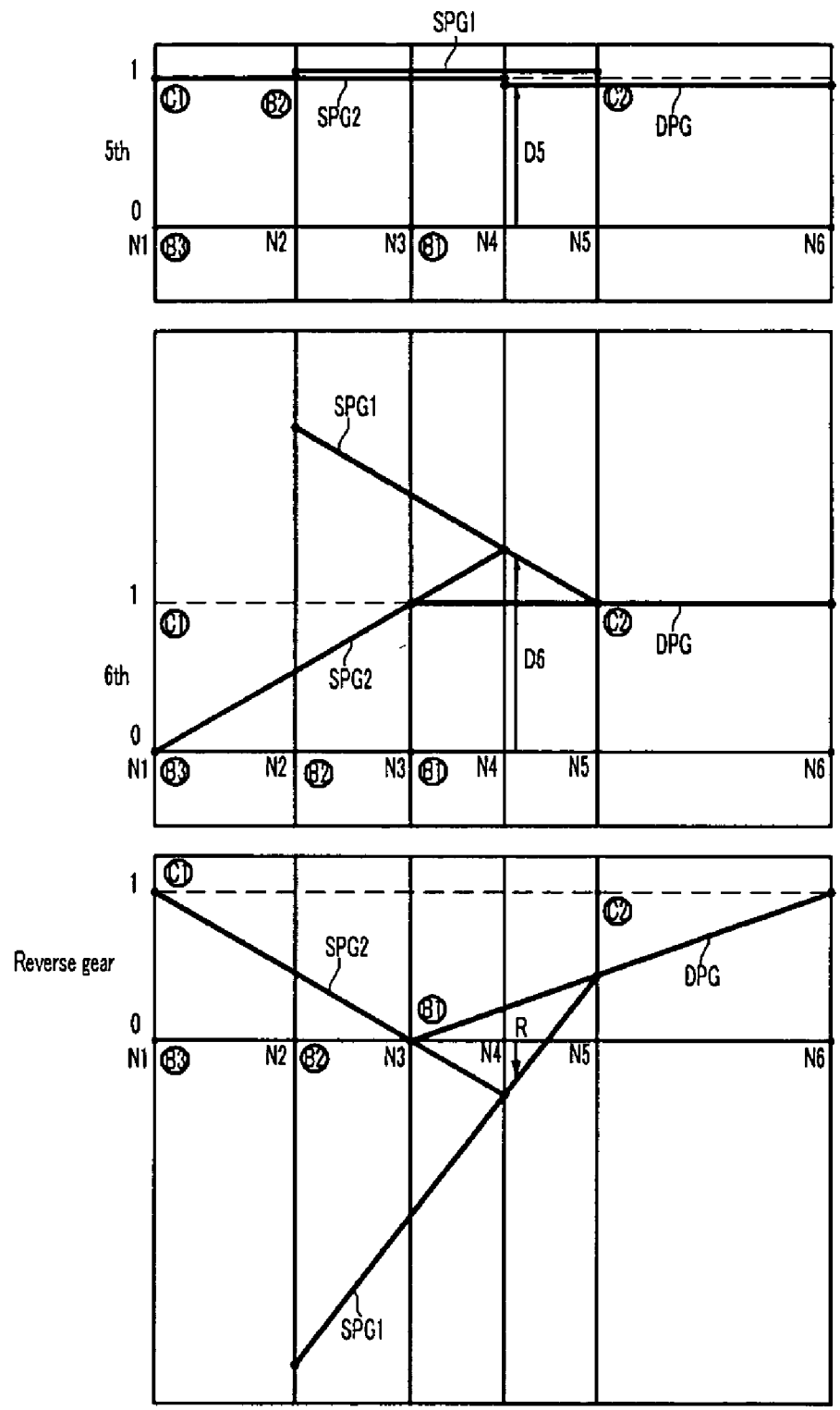
FIG. 19 is a shift diagram of the fourth to sixth forward speeds and the reverse speed of a powertrain according to the fourteenth exemplary embodiment of the present invention.

Therefore, a shifting operation of the powertrain according to the fourteenth exemplary embodiment of the present invention may be referred to FIG. 18 and FIG. 19, of which the detailed understanding should be obvious to a person of an ordinary skill in the art referring to the above description in connection with the first exemplary embodiment.

Hereinafter, the fifteenth exemplary embodiment of the present invention will be described in detail with reference to FIG. 20.

Figure 20:
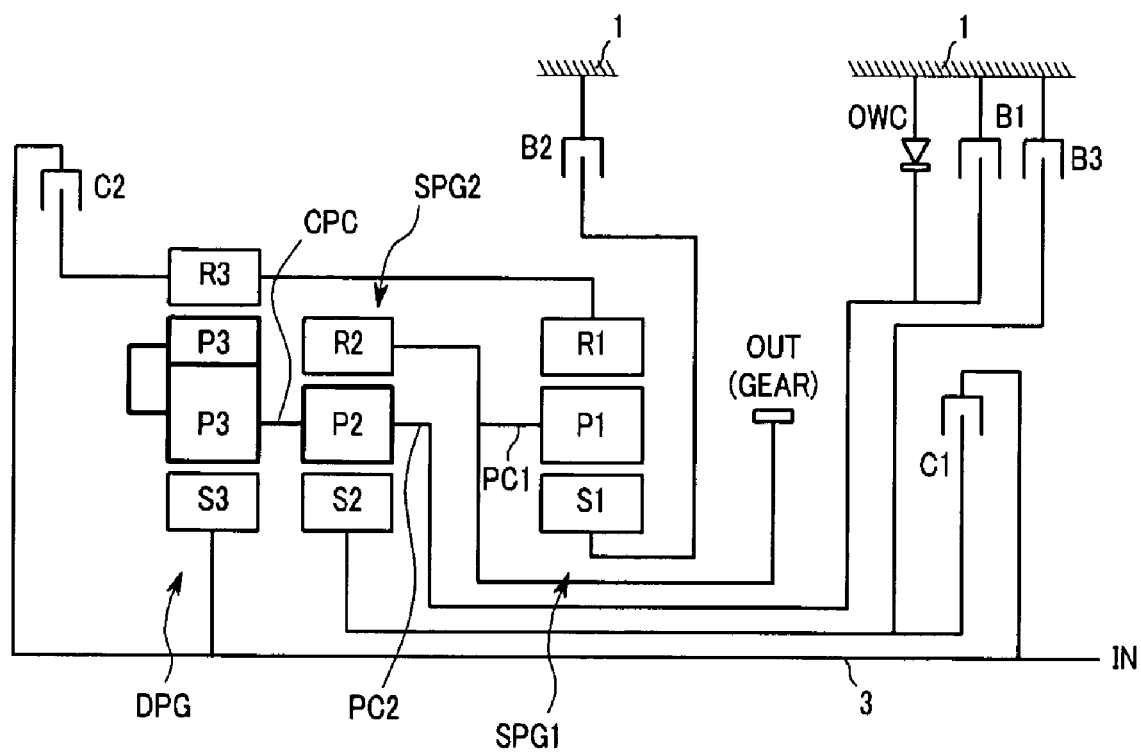
FIG. 20 is a schematic diagram of a powertrain according to a fifteenth exemplary embodiment of the present invention.

FIG. 20 is a schematic diagram of a powertrain according to a fifteenth exemplary embodiment of the present invention. According to the powertrain of the fifteenth exemplary embodiment of the present invention, the same as in the powertrain according to the first exemplary embodiment of the present invention, a first single pinion planetary gear set SPG1 is disposed at a front side of an input shaft 3 that is connected to an engine through a torque converter. The second single pinion planetary gear set SPG2 is disposed at a rear of the first single pinion planetary gear set SPG1, and the double pinion planetary gear set DPG is disposed at a rear of the second single pinion planetary gear set SPG2. The same as in the first exemplary embodiment, such planetary gear sets are configured to realize six forward speeds and one reverse speed by operating frictional elements of two clutches and three brakes.

According to the fifteenth exemplary embodiment, the same as in the first exemplary embodiment, the first single pinion planetary gear set SPG1 is disposed forward (i.e., toward the engine) in the transmission, the double pinion planetary gear set DPG is disposed rearward in the transmission, and the second single pinion planetary gear set SPG2 is disposed therebetween.

Also the same as in the first exemplary embodiment, five frictional elements are employed.

However, according to the fifteenth exemplary embodiment, differently from the first exemplary embodiment, the output gear OUTGEAR is connected to the first planet carrier PC1 that is fixedly connected with the second ring gear R2 of the second single pinion planetary gear set SPG2.

It is notable that, in the first exemplary embodiment, the output gear OUTGEAR is connected to the free first planet carrier PC1 of the first single pinion planetary gear set SPG1 that is operating as the output element.

In addition, according to the fifteenth exemplary embodiment, differently from the first exemplary embodiment, the third ring gear R3 is variably connected to the input shaft 3 via the second clutch C2, and a second planet carrier PC2 is variably connected to transmission case 1 via the first brake B1 and the one-way clutch OWC.

It is notable that, in the first exemplary embodiment, the third planet carrier PC3 is variably connected to the input shaft 3 via the second clutch C2 and at the same time to the transmission case 1 via the first brake B1 and the one-way clutch OWC disposed in parallel such that the third planet carrier PC3.

According to the fifteenth exemplary embodiment, torque of the input shaft 3 is transmitted to the first and second single pinion planetary gear sets SPG1 and SPG2 and the double pinion planetary gear set DPG using the combination of the five frictional elements in a slightly different route from the first exemplary embodiment. However, the operational chart of the frictional elements is the same as shown in FIG. 2 in connection with the first exemplary embodiment.

Therefore, a shifting operation of the powertrain according to the fifteenth exemplary embodiment of the present invention may be referred to FIG. 18 and FIG. 19, of which the detailed understanding should be obvious to a person of an ordinary skill in the art referring to the above description in connection with the first exemplary embodiment.

In the above description, speed lines for respective planetary gear sets should be easily understood by a person of an ordinary skill in the art, and thus, only speed lines for the first exemplary embodiment are described in detail.

As described above, the powertrain of the present invention employs two single pinion planetary gear sets and a double pinion planetary gear set. One planetary gear of the double pinion planetary gear set is interconnected with an adjacent second planetary gear of the second single pinion planetary gear set by a common planet carrier such that they may rotate independently. At the same time, at least two ring gears are integrated so as to enhance strength in axial direction, such that length and weight of a transmission may be minimized.

According to the present invention, gear ratios at the reverse gear and the highest gear is increased so as to enhance gradeability in the reverse speed and front wheel drive performance, and the gear ratio at the first forward speed is lowered so as to minimize the tire slip at a hard acceleration. At the same time, the step ratio between the second and third forward speeds may be set to be appropriate so as to avoid a tip-in shock.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission, comprising:
    first and second single pinion planetary gear sets and a double pinion planetary gear set; and
    two clutches and three brakes acting thereon to form six forward speeds and one reverse speed, wherein
    one planetary gear of the double pinion planetary gear set is interconnected with an adjacent second planetary gear of the second single pinion planetary gear set by a common planet carrier such that they may rotate independently;
    a ring gear of the double pinion planetary gear set and a ring gear of the first single pinion planetary gear set are fixedly connected together;
    a ring gear of the second single pinion planetary gear set and a planet carrier of the first single pinion planetary gear set are fixedly interconnected; and
    a sun gear of the double pinion planetary gear set always receives a torque from an input shaft.

2. The six-speed powertrain of claim 1, wherein:
    the first and second single pinion planetary gear sets and the double pinion planetary gear set are disposed in an order of the first single pinion planetary gear set, the second single pinion planetary gear set, and the double pinion planetary gear set from an engine connected with the input shaft;
    a sun gear of the first single pinion planetary gear set is variably connected to a transmission case via a brake, and a planet carrier thereof acts as an output element;
    a sun gear of the second single pinion planetary gear set is variably connected to the input shaft via a clutch and also variably connected to the transmission case via a brake; and
    an operating element rotating at a common speed with the common planet carrier connecting planetary gears of the second single pinion planetary gear set and the double pinion planetary gear set is variably connected to the input shaft via a clutch and also to the transmission case via a brake and a one-way clutch disposed in parallel.

3. The six-speed powertrain of claim 2, wherein the operating element rotating at the common speed with the common planet carrier is the planet carrier of the double pinion planetary gear set that is variably connected to the input shaft via the clutch, and also variably connected to the transmission case via the brake and the one-way clutch.

4. The six-speed powertrain of claim 2, wherein:
    the operating element rotating at the common speed with the common planet carrier is the planet carrier of the double pinion planetary gear set that is variably connected to the input shaft via the clutch; and
    the planet, carrier of the second single pinion planetary gear set is variably connected to the transmission case via the brake and the one-way clutch.

5. The six-speed powertrain of claim 2, wherein:
    the operating element rotating at the common speed with the common planet carrier is the planet carrier of the double pinion planetary gear set that is variably connected to the transmission case via the brake and the one-way clutch; and
    the common planet carrier is variably connected to the input shaft via the clutch.

6. The six-speed powertrain of claim 2, wherein:
    the operating element rotating at the common speed with the common planet carrier is the planet carrier of the second single pinion planetary gear set that is variably connected to the transmission case via the brake and the one-way clutch; and
    the common planet carrier is variably connected to the input shaft via the clutch.

7. The six-speed powertrain of claim 2, wherein a free planet carrier of the first single pinion planetary gear set is connected with an output gear so as to act as an output element.

8. The six-speed powertrain of claim 2, wherein the planet carrier of the first single pinion planetary gear set fixedly connected with the ring gear of the second single pinion planetary gear set is connected with an output gear so as to act as an output element.

9. The six-speed powertrain of claim 2, wherein the clutch connected to the sun gear of the second single pinion planetary gear set and the clutch connected to the operating element rotating at the common speed with the common planet carrier are dividedly disposed to both exterior sides of the first and second single pinion planetary gear sets and the double pinion planetary gear set.

10. The six-speed powertrain of claim 2, wherein the clutch connected to the sun gear of the second single pinion planetary gear set and the clutch connected to the operating element rotating at the common speed with the common planet carrier are disposed in parallel at an engine side of the first single pinion planetary gear set.

11. The six-speed powertrain of claim 2, wherein:
    the brake variably connecting the sun gear of the first single pinion planetary gear set to the transmission case is defined as a second brake;
    the clutch variably connecting the sun gear of the second single pinion planetary gear set to the input shaft is defined as a first clutch;

the brake variably connecting the sun gear of the second single pinion planetary gear set to the transmission case is defined as a third brake;

the clutch variably connecting the operating element rotating at the common speed with the common planet carrier to the input shaft is defined as a second clutch;

the brake variably connecting the operating element rotating at the common speed with the common planet carrier to the transmission case is defined as a first brake;

for the first forward speed, the second brake and the one-way clutch operate;

for the second forward speed, the third brake operates from the state of the first forward speed;

for the third forward speed, the third brake is released and the first clutch operates from the state of the second forward speed;

for the fourth forward speed, the first clutch is released and the second clutch operates from the state of the third forward speed;

for the fifth forward speed, the second brake is released and the first clutch operates from the state of the fourth forward speed;

for the sixth forward speed, the first clutch is released and the third brake operates from the state of the fifth forward speed; and for the reverse speed, the first clutch and the first brake operate.

12. The six-speed powertrain of claim 1, wherein:

the first and second single pinion planetary gear sets and the double pinion planetary gear set are disposed in an order of the first single pinion planetary gear set, double pinion planetary gear set, and the second single pinion planetary gear set from an engine connected with the input shaft;

a sun gear of the first single pinion planetary gear set is variably connected to the transmission case via a brake and a planet carrier thereof acts as an output element;

a sun gear of the second single pinion planetary gear set is variably connected to the input shaft via a clutch and also variably connected to the transmission case via a brake; and an operating element rotating at a common speed with the common planet carrier connecting planetary gears of the second single pinion planetary gear set and the double pinion planetary gear set is variably connected to the input shaft via a clutch and also variably connected to the transmission case via a brake and a one-way clutch disposed in parallel.

13. The six-speed powertrain of claim 12, wherein:

the operating element rotating at the common speed with the common planet carrier is the planet carrier of the double pinion planetary gear set that is variably connected to the input shaft via the clutch; and the planet carrier of the second single pinion planetary gear set is variably connected to the transmission case via the brake and the one-way clutch.

14. The six-speed powertrain of claim 12, wherein:

the operating element rotating at the common speed with the common planet carrier is the planet carrier of the second single pinion planetary gear set that is variably connected to the transmission case via the brake and the one-way clutch; and the common planet carrier is variably connected to the input shaft via the clutch.

15. The six-speed powertrain of claim 12, wherein the planet carrier of the first single pinion planetary gear set fixedly connected with the ring gear of the second single pinion planetary gear set is connected with an output gear so as to act as an output element.

16. The six-speed powertrain of claim 12, wherein the clutch connected to the sun gear of the second single pinion planetary gear set and the clutch connected to the operating element rotating at the common speed with the common planet carrier are dividedly disposed to both exterior sides of the first and second single pinion planetary gear sets and the double pinion planetary gear set.

17. The six-speed powertrain of claim 12, wherein the clutch connected to the sun gear of the second single pinion planetary gear set and the clutch connected to the operating element rotating at the common speed with the common planet carrier are respectively disposed exterior to the second single pinion planetary gear set and between the double pinion planetary gear set and the first single pinion planetary gear set.

18. The six-speed powertrain of claim 12, wherein the clutch connected to the sun gear of the second single pinion planetary gear set and the clutch connected to the operating element rotating at the common speed with the common planet carrier are disposed in parallel at an exterior side of the second single pinion planetary gear set opposite to the engine.

19. The six-speed powertrain of claim 12, wherein:

the brake variably connecting the sun gear of the first single pinion planetary gear set to the transmission case is defined as a second brake;

the clutch variably connecting the sun gear of the second single pinion planetary gear set to the input shaft is defined as a first clutch;

the brake variably connecting the sun gear of the second single pinion planetary gear set to the transmission case is defined as a third brake;

the clutch variably connecting the operating element rotating at the common speed with the common planet carrier to the input shaft is defined as a second clutch;

the brake variably connecting the operating element rotating at the common speed with the common planet carrier to the transmission case is defined as a first brake;

for the first forward speed, the second brake and the one-way clutch operate;

for the second forward speed, the third brake operates from the state of the first forward speed;

for the third forward speed, the third brake is released and the first clutch operates from the state of the second forward speed;

for the fourth forward speed, the first clutch is released and the second clutch operates from the state of the third forward speed;

for the fifth forward speed, the second brake is released and the first clutch operates from the state of the fourth forward speed;

for the sixth forward speed, the first clutch is released and the third brake operates from the state of the fifth forward speed; and for the reverse speed, the first clutch and the first brake operate.

20. The six-speed powertrain of claim 1, wherein:

the first and second single pinion planetary gear sets and the double pinion planetary gear set are disposed in an order of the second single pinion planetary gear set, the double pinion planetary gear set, and the first single pinion planetary gear set from an engine connected with the input shaft;

a sun gear of the first single pinion planetary gear set is variably connected to the transmission case via a brake, a planet carrier thereof or a ring gear of the double pinion planetary gear set fixedly connected therewith acts as an output element;

a sun gear of the second single pinion planetary gear set is variably connected to the input shaft via a clutch and also variably connected to the transmission case via a brake; and an operating element rotating at a common speed with the common planet carrier connecting planetary gears of the second single pinion planetary gear set and the double pinion planetary gear set is variably connected to the input shaft via a clutch and also variably connected to the transmission case via a brake and a one-way clutch disposed in parallel.

21. The six-speed powertrain of claim 20, wherein:

the operating element rotating at the common speed with the common planet carrier is the planet carrier of the double pinion planetary gear set that is variably connected to the input shaft via the clutch; and the planet carrier of the second single pinion planetary gear set is variably connected to the transmission case via the brake and the one-way clutch.

22. The six-speed powertrain of claim 20, wherein:

the operating element rotating at the common speed with the common planet carrier is the planet carrier of the second single pinion planetary gear set that is variably connected to the transmission case via the brake and the one-way clutch; and the common planet carrier is variably connected to the input shaft via the clutch.

23. The six-speed powertrain of claim 20, wherein the ring gear of the double pinion planetary gear set fixedly connected to the planet carrier of the first single pinion planetary gear set is connected with an output gear so as to act as an output element.

24. The six-speed powertrain of claim 20, wherein a free planet carrier of the first single pinion planetary gear set is connected with an output gear so as to act as an output element.

25. The six-speed powertrain of claim 20, wherein:

the brake variably connecting the sun gear of the first single pinion planetary gear set to the transmission case is defined as a second brake;

the clutch variably connecting the sun gear of the second single pinion planetary gear set to the input shaft is defined as a first clutch;

the brake variably connecting the sun gear of the second single pinion planetary gear set to the transmission case is defined as a third brake;

the clutch variably connecting the operating element rotating at the common speed with the common planet carrier to the input shaft is defined as a second clutch;

the brake variably connecting the operating element rotating at the common speed with the common planet carrier to the transmission case is defined as a first brake;

for the first forward speed, the second brake and the one-way clutch operate;

for the second forward speed, the third brake operates from the state of the first forward speed;

for the third forward speed, the third brake is released and the first clutch operates from the state of the second forward speed;

for the fourth forward speed, the first clutch is released and the second clutch operates from the state of the third forward speed;

for the fifth forward speed, the second brake is released and the first clutch operates from the state of the fourth forward speed;

for the sixth forward speed, the first clutch is released and the third brake operates from the state of the fifth forward speed; and for the reverse speed, the first clutch and the first brake operate.

26. The six-speed powertrain of claim 1, wherein:

the first and second single pinion planetary gear sets and the double pinion planetary gear set are disposed in an order of the first single pinion planetary gear set, the second single pinion planetary gear set, and the double pinion planetary gear set from an engine connected with the input shaft;

a sun gear of the first single pinion planetary gear set is variably connected to the transmission case via a brake and a planet carrier thereof acts as an output element;

a sun gear of the second single pinion planetary gear set is variably connected to the input shaft via a clutch and also variably connected to the transmission case via a brake;

ring gear of the double pinion planetary gear set is variably connected to the input shaft via the clutch; and the planet carrier of the second single pinion planetary gear set is variably connected to the transmission case via the brake and the one-way clutch.

27. The six-speed powertrain of claim 26, wherein a free planet carrier of the first single pinion planetary gear set is connected with an output gear so as to act as an output element.

28. The six-speed powertrain of claim 26, wherein the planet carrier of the first single pinion planetary gear set fixedly connected with the ring gear of the second single pinion planetary gear set is connected with an output gear so as to act as an output element.

29. The six-speed powertrain of claim 26, wherein:

the brake variably connecting the sun gear of the first single pinion planetary gear set to the transmission case is defined as a second brake;

the clutch variably connecting the sun gear of the second single pinion planetary gear set to the input shaft is defined as a first clutch;

the brake variably connecting the sun gear of the second single pinion planetary gear set to the transmission case is defined as a third brake;

the clutch variably connecting the ring gear of the double pinion planetary gear set to the input shaft is defined as a second clutch;

the brake variably connecting the planet carrier of the second single pinion planetary gear set to the transmission case is defined as a first brake;

for the first forward speed, the second brake and the one-way clutch operate;

for the second forward speed, the third brake operates from the state of the first forward speed;

for the third forward speed, the third brake is released and the first clutch operates from the state of the second forward speed;

for the fourth forward speed, the first clutch is released and the second clutch operates from the state of the third forward speed;

for the fifth forward speed, the second brake is released and the first clutch operates from the state of the fourth forward speed;

for the sixth forward speed, the first clutch is released and the third brake operates from the state of the fifth forward speed;

for the reverse speed, the first clutch and the first brake operate.

30. A six-speed powertrain of an automatic transmission, comprising:

a first single pinion planetary gear set including a first sun gear, a first planetary gear, and a first ring gear;

a second single pinion planetary gear set including a second sun gear, a second planetary gear, and a second ring gear; and a double pinion planetary gear set including a third sun gear, a pair of third planetary gears, and a third ring gear, wherein:

one third planetary gear of the pair of third planetary gears is interconnected with an adjacent second planetary gear by a common planet carrier such that they may rotate independently;

the third ring gear and the first ring gear are fixedly connected together;

the second ring gear and the first planet carrier are fixedly connected; and the third sun gear is fixedly connected with an input shaft so as to always receive a torque therefrom;

at least two clutches and three brakes coordinate with said gear sets to realize six forward speeds and one reverse speed.

31. The six-speed powertrain of claim 30, wherein:

the first and second single pinion planetary gear sets and the double pinion planetary gear set are disposed are disposed in an order of the first single pinion planetary gear set, the second single pinion planetary gear set, and the double pinion planetary gear set from an engine connected with the input shaft;

the first sun gear is variably connected to the transmission case via the second brake and the first planet carrier act as an output element;

the second sun gear is variably connected to the input shaft via the first clutch and also variably connected to the transmission case via the third brake; and an operating element rotating at a common speed with the common planet carrier interconnecting the second and third planetary gears is variably connected to the input shaft via the second clutch and also variably connected to the transmission case via the first brake and the one-way clutch disposed in parallel.

32. The six-speed powertrain of claim 31, wherein the operating element rotating at the common speed with the common planet carrier is the third planet carrier that is variably connected to the input shaft via the second clutch and also variably connected to the transmission case via the first brake and the one-way clutch.

33. The six-speed powertrain of claim 31, wherein:

the operating element rotating at the common speed with the common planet carrier is the third planet carrier that is variably connected to the input shaft via the second clutch; and the second planet carrier is variably connected to the transmission case via the first brake and the one-way clutch.

34. The six-speed powertrain of claim 31, wherein:

the operating element rotating at the common speed with the common planet carrier is the third planet carrier that is variably connected to the transmission case via the first brake and the one-way clutch; and the common planet carrier is variably connected to the input shaft via the second clutch.

35. The six-speed powertrain of claim 31, wherein:

the operating element rotating at the common speed with the common planet carrier is the second planet carrier that is variably connected to the transmission case via the first brake and the one-way clutch; and the common planet carrier is variably connected to the input shaft via the second clutch.

36. The six-speed powertrain of claim 31, wherein a free first planet carrier is connected with an output gear so as to act as an output element.

37. The six-speed powertrain of claim 31, wherein the first planet carrier fixedly connected with the second ring gear is connected with an output gear so as to act as an output element.

38. The six-speed powertrain of claim 31, wherein the first clutch and the second clutch are dividedly disposed to both exterior sides of the first and second single pinion planetary gear sets and the double pinion planetary gear set.

39. The six-speed powertrain of claim 31, wherein the first clutch and the second clutch are disposed in parallel at an engine side of the first single pinion planetary gear set.

40. The six-speed powertrain of claim 31, wherein:

for the first forward speed, the second brake and the one-way clutch operate;

for the second forward speed, the third brake operates from the state of the first forward speed;

for the third forward speed, the third brake is released and the first clutch operates from the state of the second forward speed;

for the fourth forward speed, the first clutch is released and the second clutch operates from the state of the third forward speed;

for the fifth forward speed, the second brake is released and the first clutch operates from the state of the fourth forward speed for the sixth forward speed, the first clutch is released and the third brake operates from the state of the fifth forward speed; and for the reverse speed, the first clutch and the first brake operate.

41. The six-speed powertrain of claim 30, wherein:

the first and second single pinion planetary gear sets and the double pinion planetary gear set are disposed in an order of the first single pinion planetary gear set, double pinion planetary gear set, and the second single pinion planetary gear set from an engine connected with the input shaft;

the first sun gear is variably connected to the transmission case via the second brake;

the first planet carrier acts as an output element;

the second sun gear is variably connected to the input shaft via the first clutch and also variably connected to the transmission case via the third brake; and an operating element rotating at the common speed with the common planet carrier interconnecting the second and third planetary gears is variably connected to the input shaft via the second clutch and also variably connected to the transmission case via the first brake and the one-way clutch disposed in parallel.

42. The six-speed powertrain of claim 41, wherein:
the operating element rotating at the common speed with the common planet carrier is the third planet carrier that is variably connected to the input shaft via the second clutch;
the second planet carrier is variably connected to the transmission case via the first brake and the one-way clutch.

43. The six-speed powertrain of claim 41, wherein:
the operating element rotating at the common speed with the common planet carrier is the second planet carrier that is variably connected to the transmission case via the first brake and the one-way clutch; and
the common planet carrier is variably connected to the input shaft via the second clutch.

44. The six-speed powertrain of claim 41, wherein the first planet carrier fixedly connected with the second ring gear is connected with an output gear so as to act as an output element.

45. The six-speed powertrain of claim 41, wherein the first clutch and the second clutch are dividedly disposed to both exterior sides of the first and second single pinion planetary gear sets and the double pinion planetary gear set.

46. The six-speed powertrain of claim 41, wherein the first clutch and the second clutch are respectively disposed exterior to the second single pinion planetary gear set and between the double pinion planetary gear set and the first single pinion planetary gear set.

47. The six-speed powertrain of claim 41, wherein the first clutch and the second clutch are disposed in parallel at an exterior side of the second single pinion planetary gear set opposite to the engine.

48. The six-speed powertrain of claim 41, wherein:
for the first forward speed, the second brake and the one-way clutch operate;
for the second forward speed, the third brake operates from the state of the first forward speed;
for the third forward speed, the third brake is released and the first clutch operates from the state of the second forward speed;
for the fourth forward speed, the first clutch is released and the second clutch operates from the state of the third forward speed;
for the fifth forward speed, the second brake is released and the first clutch operates from the state of the fourth forward speed;
for the sixth forward speed, the first clutch is released and the third brake operates from the state of the fifth forward speed; and
for the reverse speed, the first clutch and the first brake operate.

49. The six-speed powertrain of claim 30, wherein:
the first and second single pinion planetary gear sets and the double pinion planetary gear set are disposed in an order of the second single pinion planetary gear set, the double pinion planetary gear set, and the first single pinion planetary gear set from an engine connected with the input shaft;
the first sun gear is variably connected to the transmission case via the second brake;
the first planet carrier or the third ring gear fixedly connected thereto acts as an output element;
the second sun gear is variably connected to the input shaft via the first clutch and also variably connected to the transmission case via the third brake; and
an operating element rotating at a common speed with the common planet carrier interconnecting the second and third planetary gears is variably connected to the input shaft via the second clutch and also variably connected to the transmission case via the second brake and the one-way clutch disposed in parallel.

50. The six-speed powertrain of claim 49, wherein:
operating element rotating at the common speed with the common planet carrier is the third planet carrier that is variably connected to the input shaft via the second clutch; and
the second planet carrier is variably connected to the transmission case via the first brake and the one-way clutch.

51. The six-speed powertrain of claim 49, wherein:
the operating element rotating at the common speed with the common planet carrier is the second planet carrier that is variably connected to the transmission case via the first brake and the one-way clutch; and
the common planet carrier is variably connected to the input shaft via the second clutch.

52. The six-speed powertrain of claim 49, wherein the third ring gear fixedly connected with the first planet carrier is connected with an output gear so as to act as an output element.

53. The six-speed powertrain of claim 49, wherein a free first planet carrier is connected with an output gear so as to act as an output element.

54. The six-speed powertrain of claim 49, wherein:
for the first forward speed, the second brake and the one-way clutch operate;
for the second forward speed, the third brake operates from the state of the first forward speed;
for the third forward speed, the third brake is released and the first clutch operates from the state of the second forward speed;
for the fourth forward speed, the first clutch is released and the second clutch operates from the state of the third forward speed;
for the fifth forward speed, the second brake is released and the first clutch operates from the state of the fourth forward speed;
for the sixth forward speed, the first clutch is released and the third brake operates from the state of the fifth forward speed; and
for the reverse speed, the first clutch and the first brake operate.

55. The six-speed powertrain of claim 30, wherein:
the first and second single pinion planetary gear sets and the double pinion planetary gear set are disposed in an order of the first single pinion planetary gear set, the second single pinion planetary gear set, and the double pinion planetary gear set from an engine connected with the input shaft;
the first sun gear is variably connected to the transmission case via the second brake, and the first planet carrier acts as an output element;
the second sun gear is variably connected to the input shaft via the first clutch and also variably connected to the transmission case via the third brake;
the third ring gear is variably connected to the input shaft via the second clutch; and
the second planet carrier is variably connected to the transmission case via the first brake and one-way clutch.

56. The six-speed powertrain of claim 55, wherein a free first planet carrier is connected with an output gear so as to act as an output element.

57. The six-speed powertrain of claim 55, wherein the first planet carrier fixedly connected with the second ring gear is connected with an output gear so as to act as an output element.

58. The six-speed powertrain of claim 55, wherein:

for the first forward speed, the second brake and the one-way clutch operate;

for the second forward speed, the third brake operates from the state of the first forward speed;

for the third forward speed, the third brake is released and the first clutch operates from the state of the second forward speed;

for the fourth forward speed, the first clutch is released and the second clutch operates from the state of the third forward speed;

for the fifth forward speed, the second brake is released and the first clutch operates from the state of the fourth forward speed;

for the sixth forward speed, the first clutch is released and the third brake operates from the state of the fifth forward speed; and for the reverse speed, the first clutch and the first brake operate.

* * * * *